United States Patent
Koz

[11] Patent Number: 5,592,233
[45] Date of Patent: *Jan. 7, 1997

[54] APPARATUS AND METHOD FOR VIDEO PIXEL DATA TRANSFER

[76] Inventor: Mark C. Koz, 731 Stanford Ave., Palo Alto, Calif. 94306

[*] Notice: The term of this patent shall not extend beyond the expiration date of Pat. No. 5,341,175.

[21] Appl. No.: 484,298

[22] Filed: Jun. 7, 1995

Related U.S. Application Data

[62] Division of Ser. No. 292,831, Aug. 19, 1994, Pat. No. 5,502,503, which is a division of Ser. No. 121,718, Sep. 14, 1993, Pat. No. 5,341,175, which is a division of Ser. No. 683,593, Apr. 9, 1991, Pat. No. 5,249,164, which is a continuation-in-part of Ser. No. 545,352, Jun. 27, 1990, abandoned.

[51] Int. Cl.⁶ .................................................. H04N 9/00
[52] U.S. Cl. ........................................ 348/552; 348/554
[58] Field of Search .................................. 348/571, 552, 348/554, 578, 844; 345/150, 186; H04N 9/00

[56] References Cited

U.S. PATENT DOCUMENTS

| | | | |
|---|---|---|---|
| 4,647,968 | 3/1987 | Willis | 358/141 |
| 4,730,185 | 3/1988 | Springer et al. | 340/701 |
| 4,800,423 | 1/1989 | Appiano et al. | 358/21 R |
| 4,811,407 | 3/1989 | Blokker et al. | 358/903 X |
| 4,956,638 | 9/1990 | Larky et al. | 340/701 |
| 5,021,873 | 6/1991 | Abumi | 348/160 X |
| 5,111,296 | 5/1991 | Duffield et al. | 358/903 X |
| 5,119,074 | 6/1992 | Greaves et al. | 340/701 |
| 5,138,303 | 8/1992 | Rupel | 340/703 |
| 5,249,164 | 9/1993 | Koz | 348/552 |
| 5,341,175 | 8/1994 | Koz | 348/552 |
| 5,387,945 | 2/1995 | Takeuchi | 348/552 |

OTHER PUBLICATIONS

"A Hybrid Scheme For Color Dithering," Sloan, K., Proceedings of the SPIE – The International Society for Optical Engineering, vol. 1249, pp. 238–248. Conference Title: Human Vision and Electronic Imaging: Models, Methods and Applications, Conference Date: Feb. 12–14, 1990.
"Improved Dithering Methods For Colour Quantized Images," Watanabe, T., Transactions of the Institute of Electronics, Information and Communication.
Engineers D–II vo. J72D–II, No. 7, pp. 985–992, Jul. 1989.

*Primary Examiner*—John K. Peng
*Assistant Examiner*—Chris Grant
*Attorney, Agent, or Firm*—Donald E. Schreiber

[57] ABSTRACT

An assembly and delivery circuit and method of operation therefor which delivers a stream of pixel formatted digital video data as words to an internal bus of a host personal computer. The host personal computer receives and processes the words assembled and delivered by this circuit to present a video image on its display screen. The assembly and delivery circuit operates in conjunction with the host computer's internal bus at a sufficient speed to permit a host personal computer having a sufficient operating speed to display either black and white images, or color television images at a real-time rate of thirty frames per second.

48 Claims, 8 Drawing Sheets

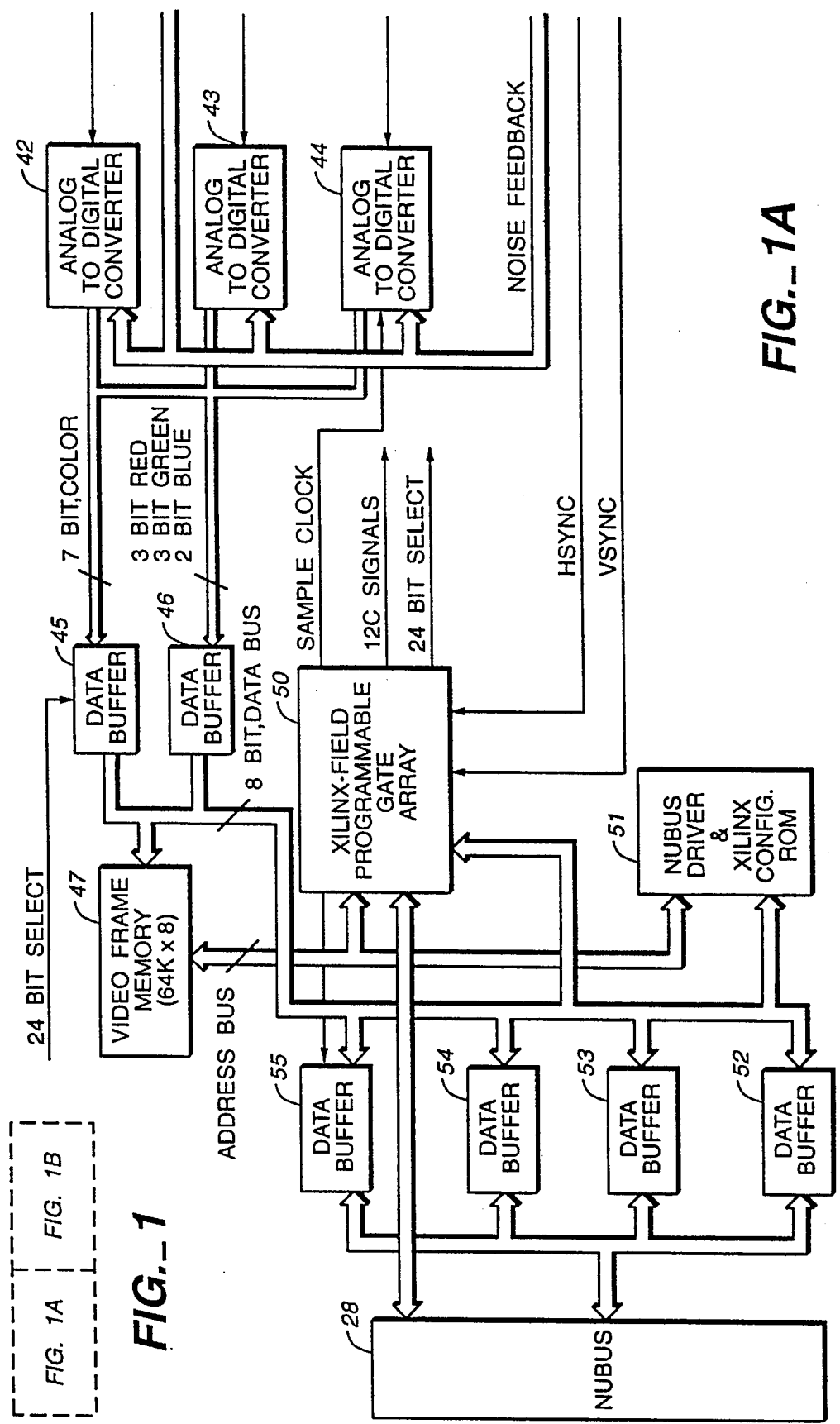

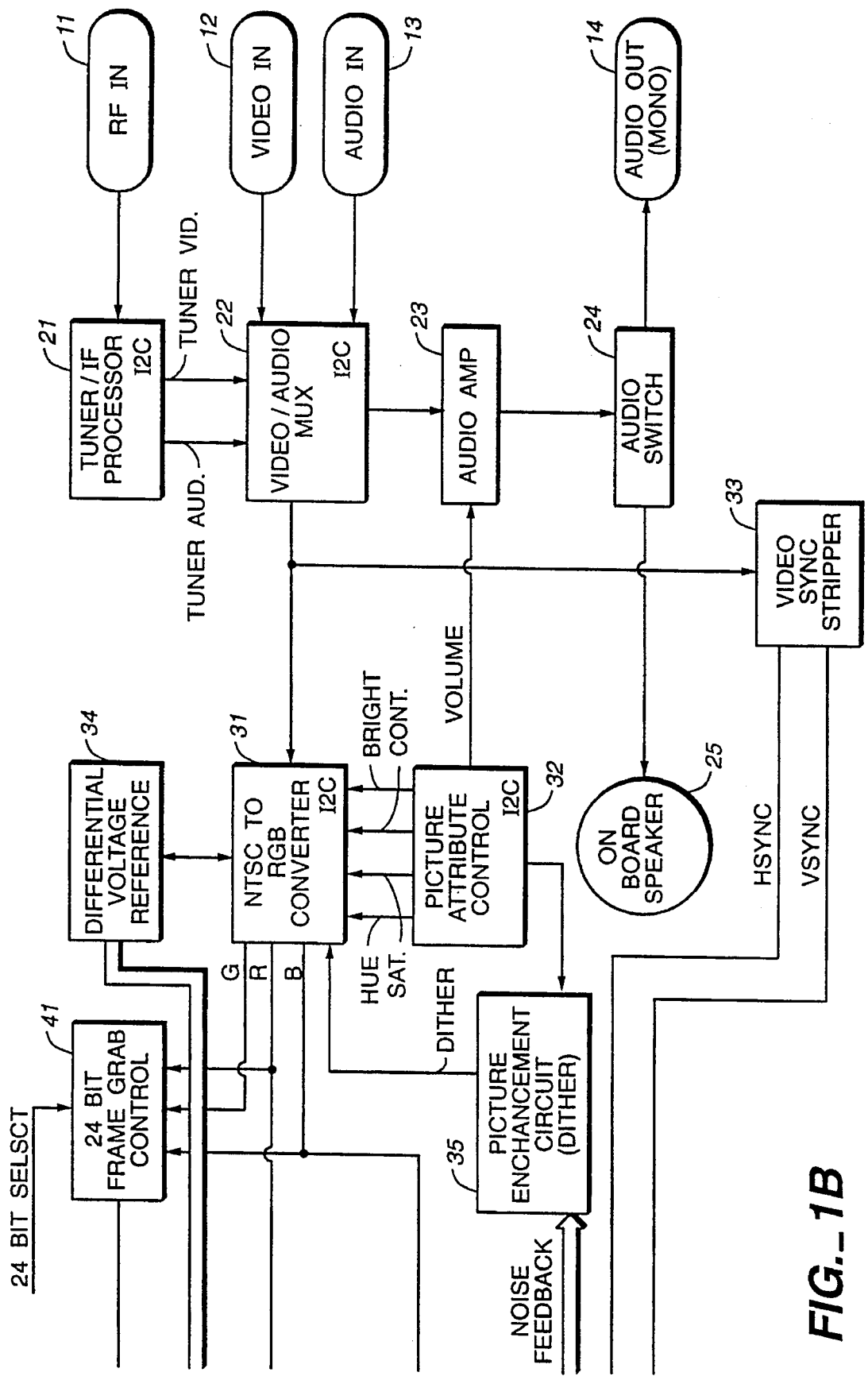
FIG._1B

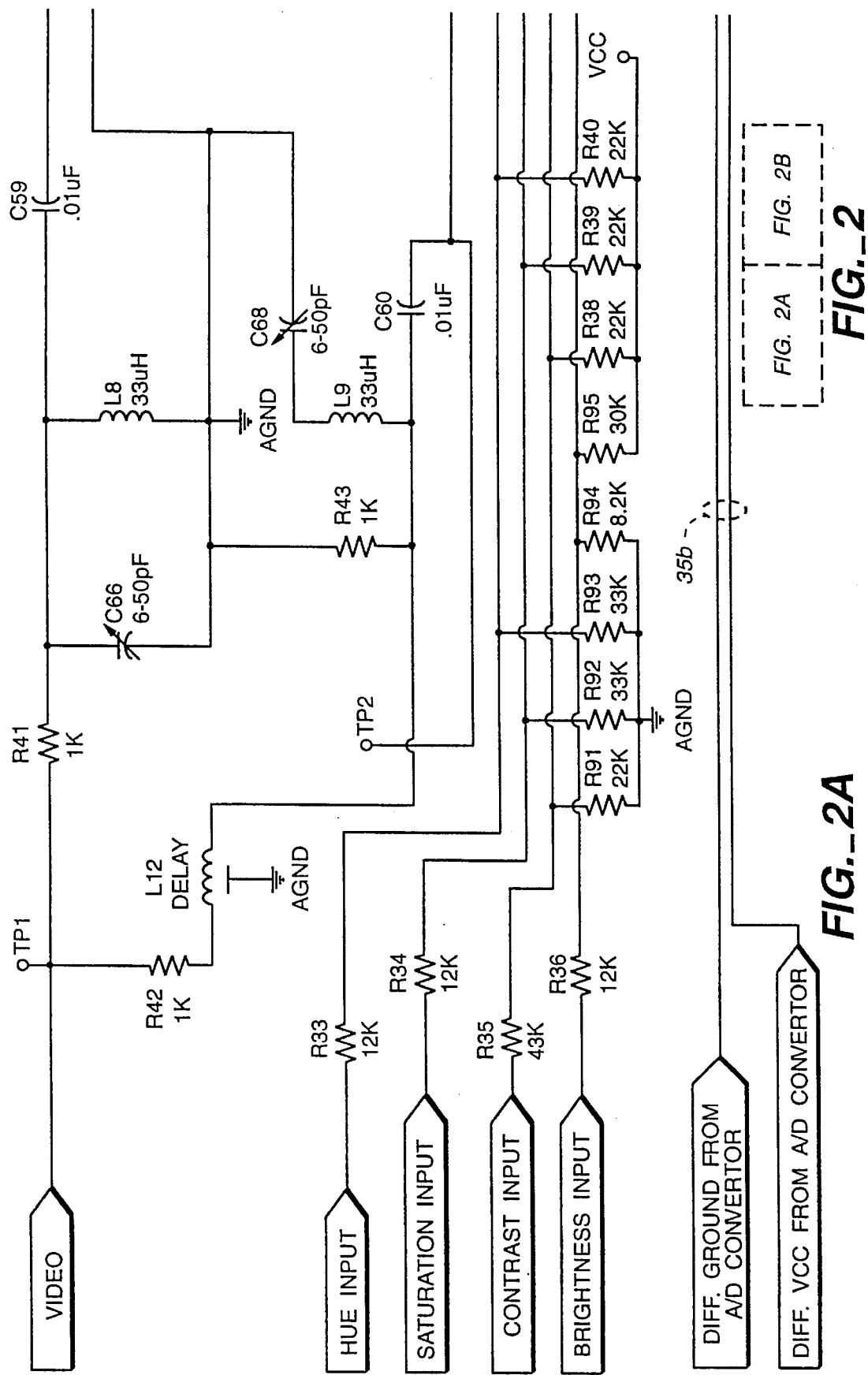

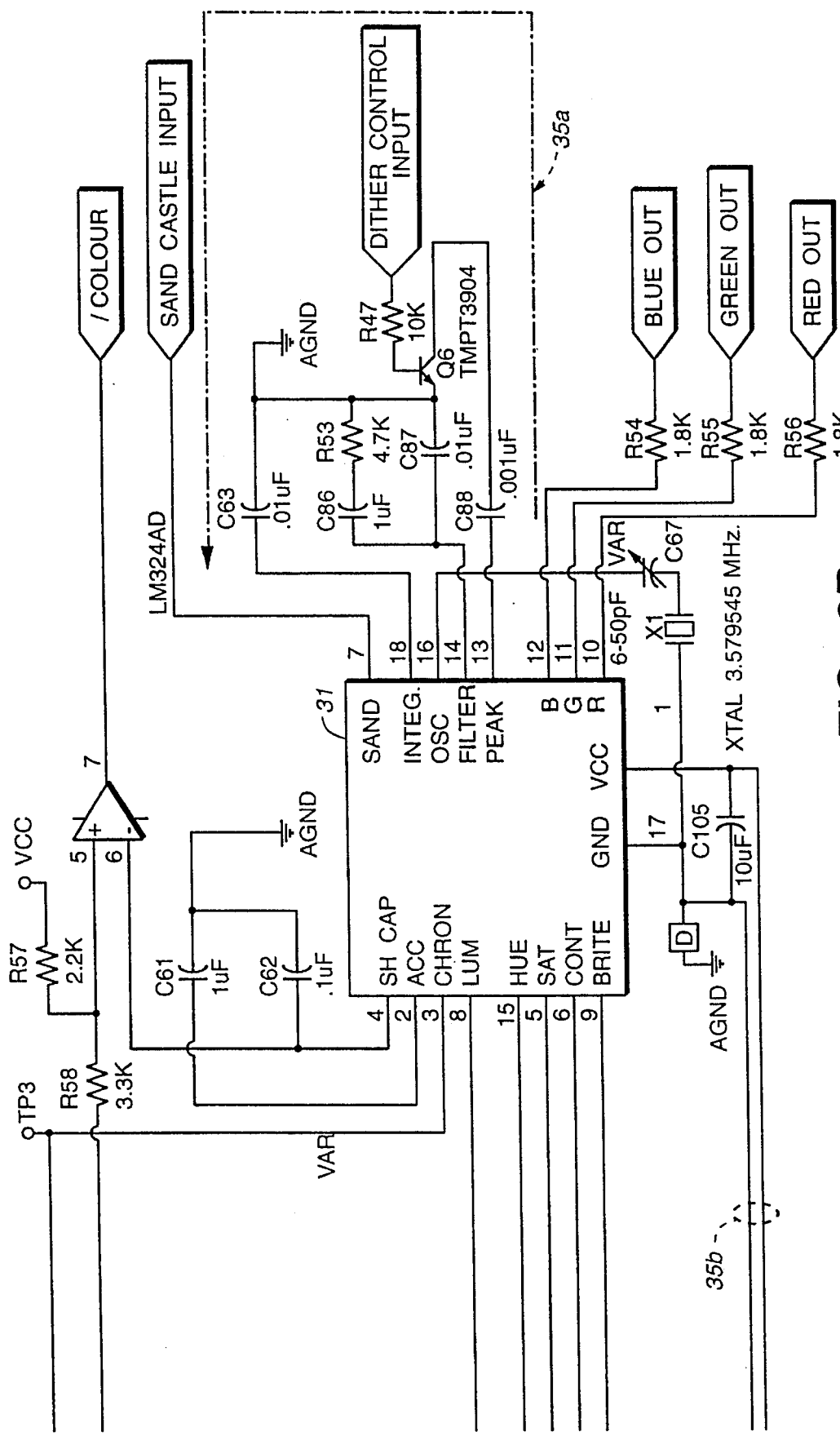
FIG._2B

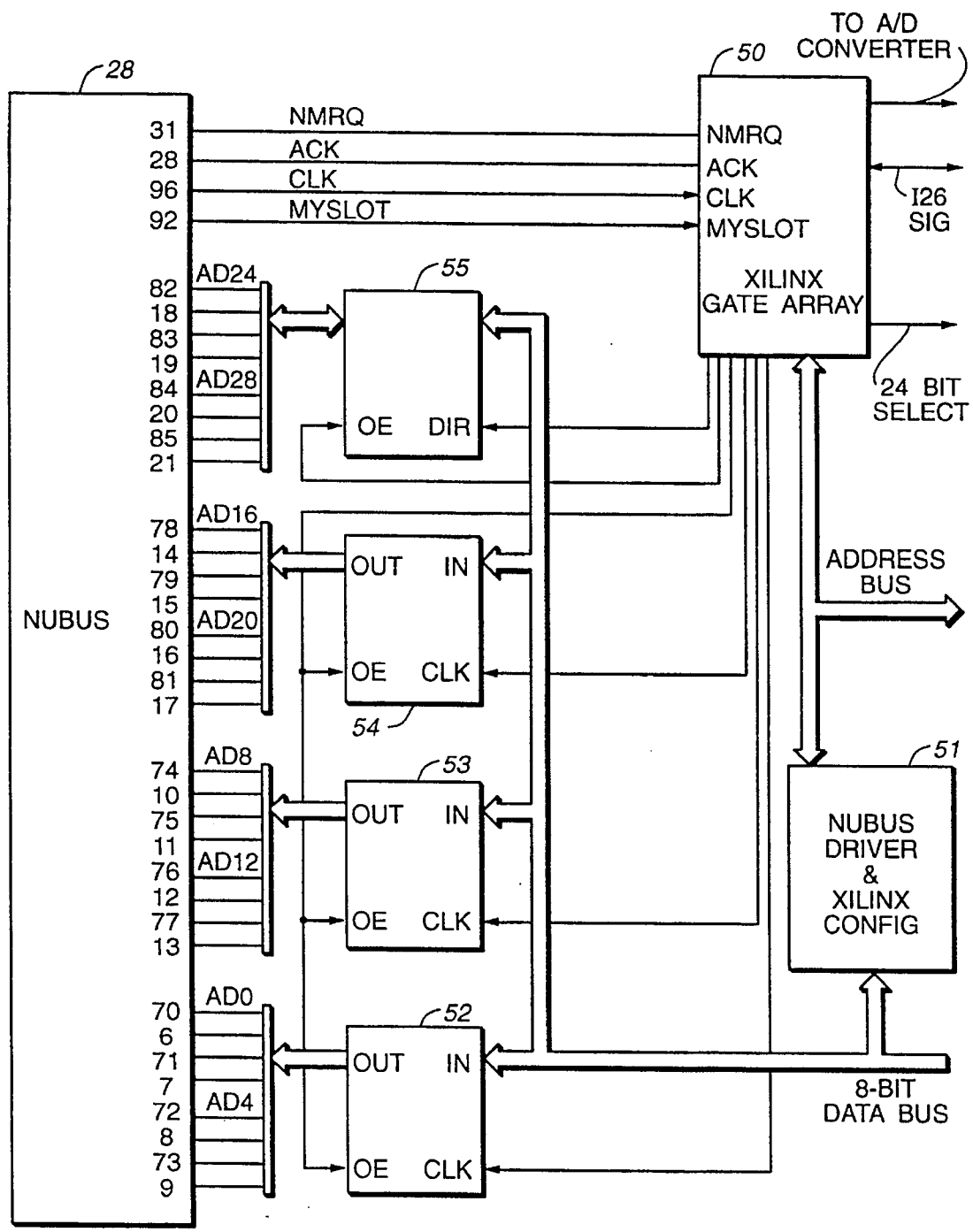
FIG._3

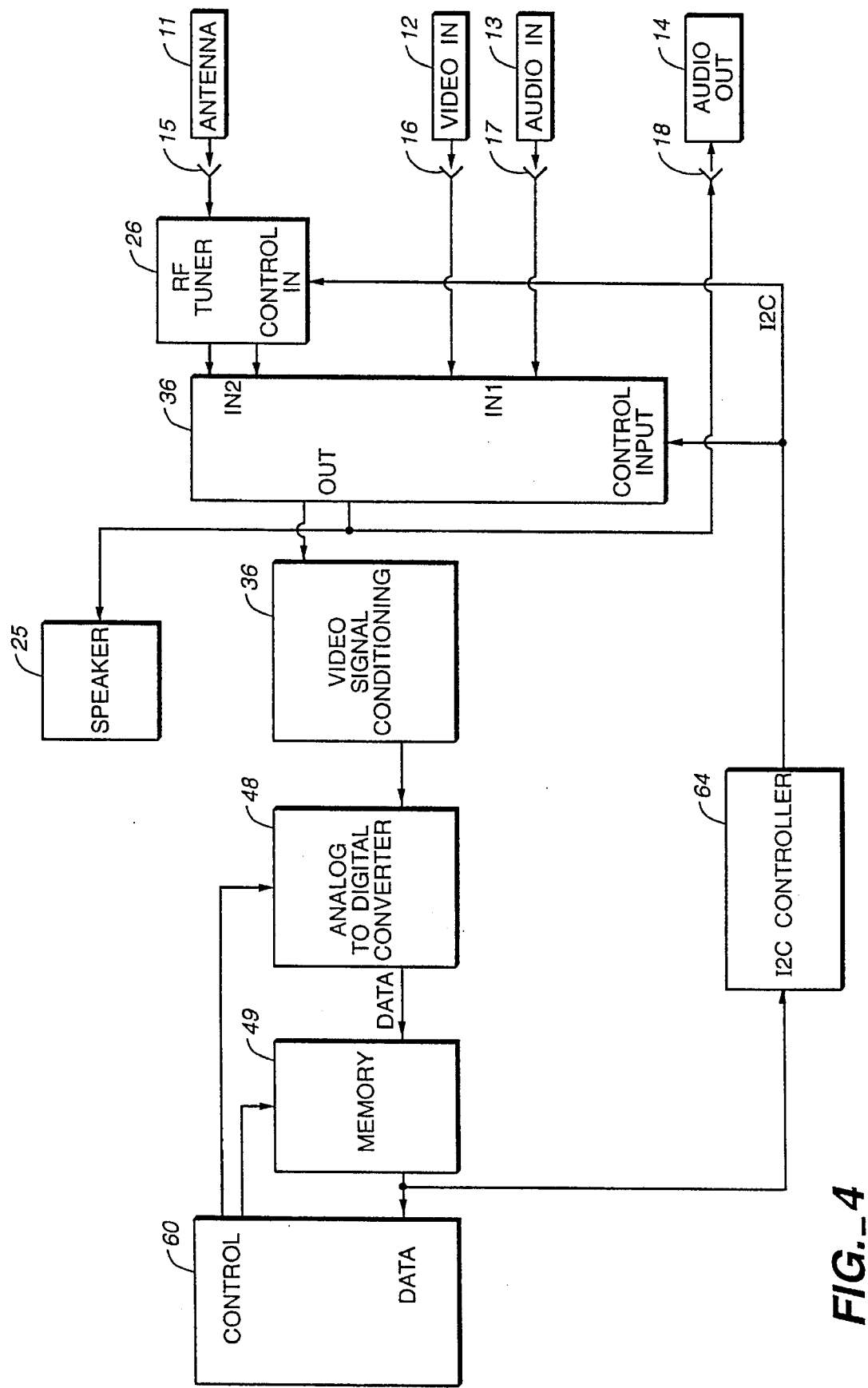
FIG._4

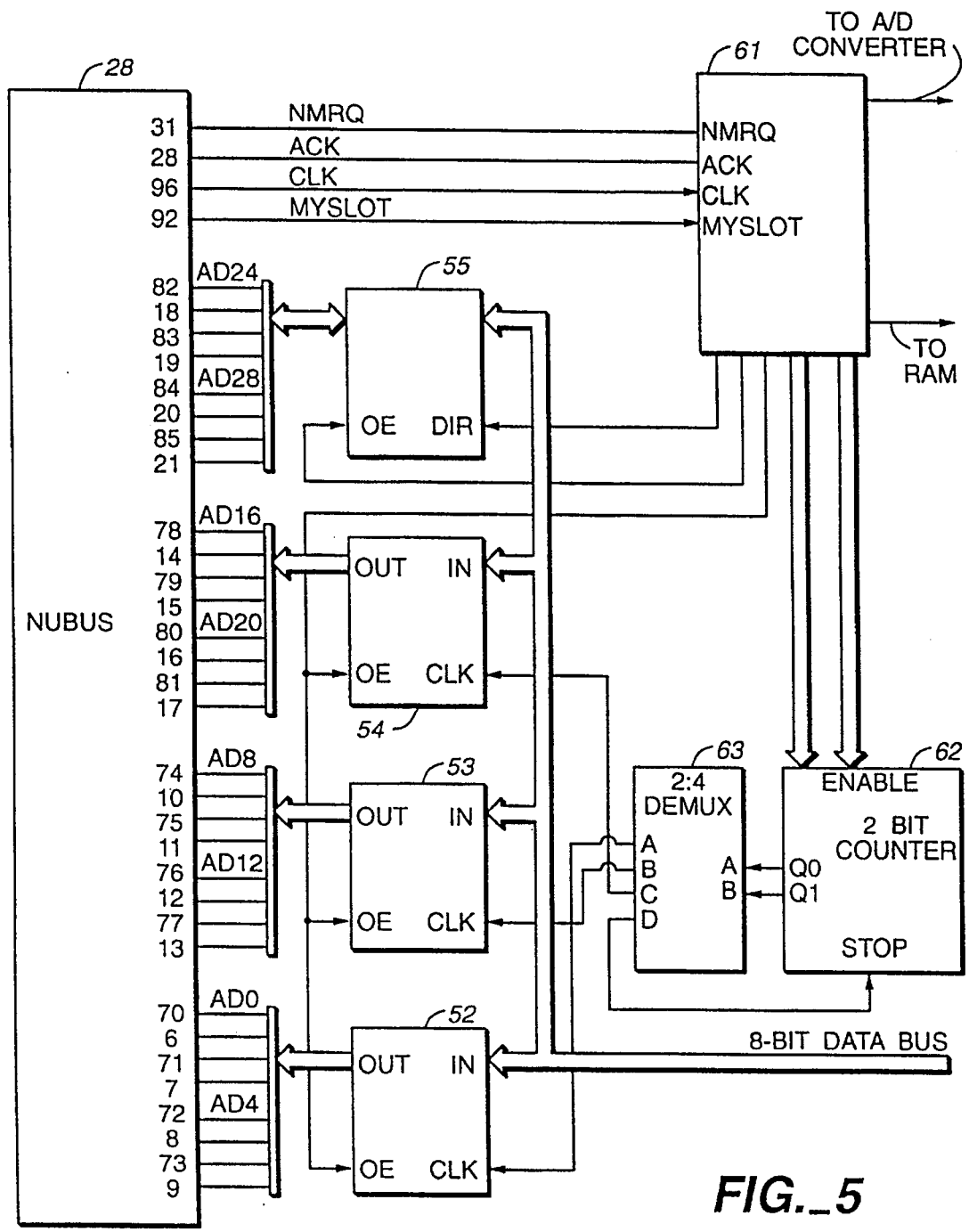
FIG._5

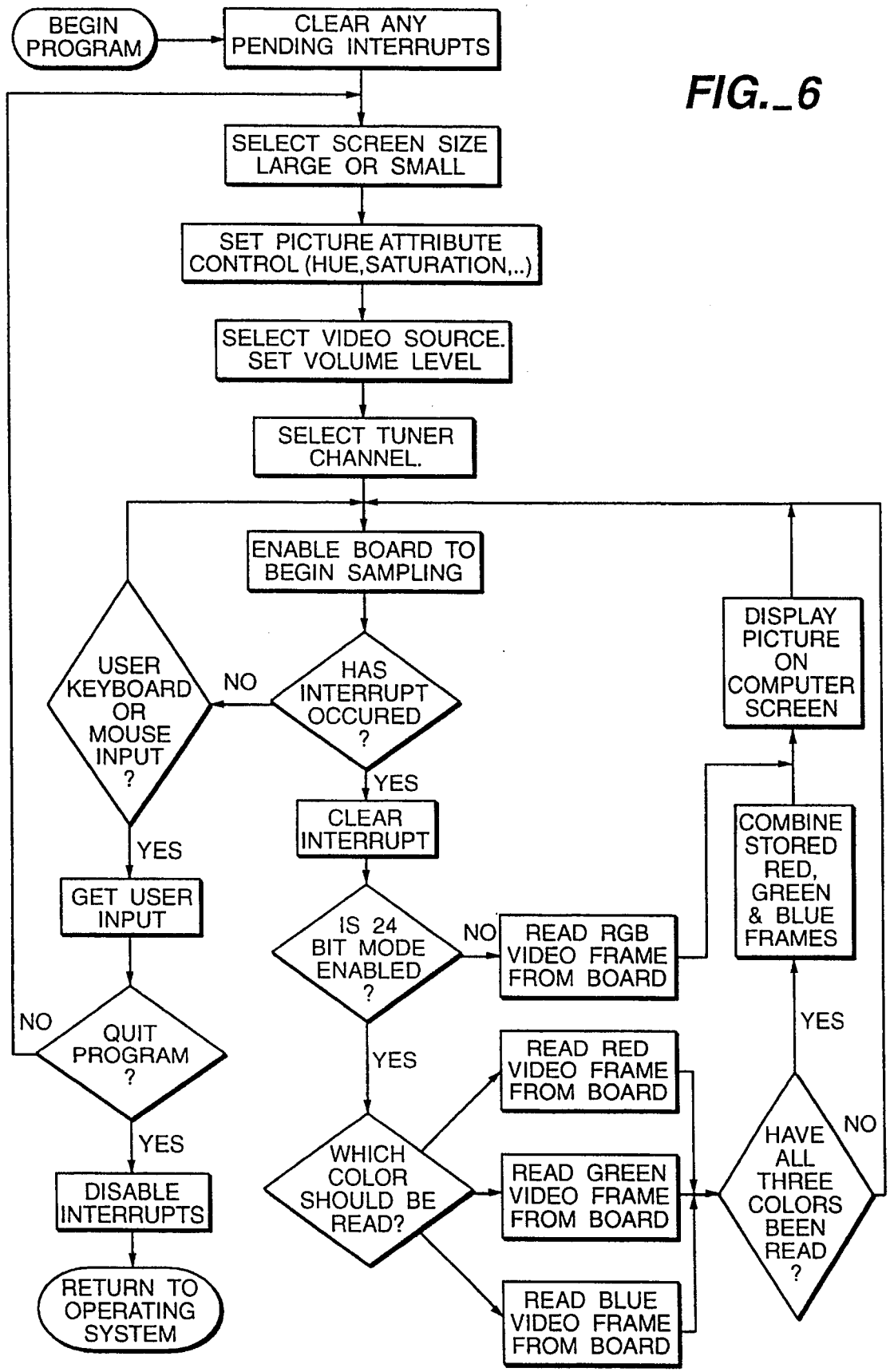
FIG._6

APPARATUS AND METHOD FOR VIDEO PIXEL DATA TRANSFER

NATURE OF THIS APPLICATION

This is a division of application Ser. No. 02/292,831 filed Aug. 19, 1994, now U.S. Pat. No. 5,502,503 which is a division of application Ser. No. 07/121,718 filed Sep. 14, 1993, which issued on Aug. 23, 1994, as U.S. Pat. No. 5,341,175; which was itself a division of application Ser. No. 07/683,593 filed Apr. 9, 1991, which issued Sep. 28, 1993, as U.S. Pat. No. 5,249,164. The great grandparent application Ser. No. 07/683,593 was itself a continuation-in-part of application Ser. No. 07/545,352 filed Jun. 27, 1990, now abandoned.

TECHNICAL FIELD

The invention is in the field of video display on a personal computer (PC). More particularly, it concerns the display of a television (TV) picture or other analog visual signal on a portion of the cathode ray tube (CRT) or monitor of a PC while the PC is running other programs. The invention comprises a standard plug-in card for a desk-type computer or work station, on which card is an all-channel television tuner which is adapted to continuously tune through all standard television channels as well as the broadcast FM frequency spectrum, and all necessary circuitry and components to demodulate the selected TV signal (or other similar analog visual signal, such as a closed-circuit surveillance, test monitoring or security system camera or playback from a video cassette recorder (VCR), digitize it, store these digitally encoded signals in a temporary memory, and through a novel multi-word buffer stage transfer the stored signals to the computer when requested during its operating cycle for display in a selected portion of its screen along with other displayed material under control of the host computer's central processor. The invention will produce picture data for display at a rate of thirty picture frames per second, which is the standard transmitted rate of broadcast and/or closed-circuit television. This picture frame rate is required for smooth motion display, and will be referred to in this specification as "real time" display or processing. In its color version, the invention also provides a slower picture display of much higher resolution, in a freeze frame or similar mode.

The invention described primarily herein will be referred to as the DigiVideo, particularly meaning its color version. Two different sizes of picture display on the associated PC may be produced. The invention is most efficiently adaptable to a computer which uses 32-bit words and has sufficient operating speed to achieve real time display, thus being particularly compatible with the Macintosh II. It is this version which will be described in detail, although the invention could be adapted to be functional in the large group of computers known as IBM (International Business Machines) compatibles and/or clones, using a common basic processing scheme and language, Micro-soft Disk Operating System (DOS) having resident either Windows 386 or Operating system/2 (OS/2). While the invention could be adaptable to the UNIX software system, in its present form it would be unable to accommodate display of 30 picture frames per second. Certain processing differences are required by variations in basic personal computers.

(The disclosure will include an earlier black and white design operating in the same manner. The black and white version provided two models delivering different picture sizes, called the MicroTV for the smaller display, DigiVideo for a unit capable of producing both display sizes.)

BACKGROUND ART

The basic processing scheme of a personal computer does not directly facilitate display of visual images showing continuous motion, as particularly exemplified by standard television transmissions. Processing and displaying pictures at this real time rate involves handling a relatively large data stream.

It can readily be seen there are numerous potential uses for the capability of viewing a motion picture or TV type image on an inset portion of a PC screen. In addition to merely watching television, surveillance and security systems come to mind—comparing a closed-circuit view of a person with file copies of photographs and clearance or authorization, for example. Viewing of testing operations (e.g.: wind tunnels or displays of changing data such as oscillographs monitored by remote cameras) while reviewing or correcting calculated data is another possibility. Reviewing forensic simulations on magnetic tape recordings while preparing or reviewing commentary or testimony is another, as well as comparison of still file photographs therewith. Other applications are not difficult to conceive.

Visual images for display on a PC are made up of pixels, or discrete image elements, each pixel requiring an eight bit word for definition. It can be seen that the operating speed of a PC will determine whether or not it is possible to achieve motion display with the smoothness which is characteristic of the standard thirty frame per second real time rate. When the PC lacks sufficient speed to display real time motion, edited or intermittent motion display could still be very useful in many applications.

Prior art methods transmit only one pixel of video at a time on the computer's internal bus, resulting in a transmission time of as much as one second or more for a black and white image, considerably longer for color, which is clearly inadequate for smooth display of images involving motion.

Prior art devices for achieving display of moving images on a PC screen from analog sources have customarily provided extra processing capability to bypass the internal computer bus cycle processing or reduce the machine time required for the picture display. This results in an increase in equipment expense, as processors are relatively expensive, as well as increasing the bulk and installation complexity of the equipment.

Applicant is aware of two current art products which seek to achieve a result similar to the current invention.

1. A device called the MassMicro, selling for about $3,000, it is believed. This device requires two plug-in cards and includes its own video output card, producing a video overlay which it mixes directly with the picture displayed by the PC. The host PC's main processor never sees the data being processed by the MassMicro.

2. A device called the OrangeMicro, selling for about $4,000, it is believed. This device also requires two plug-in cards, and has its own processor, taking over the PC data bus as a bus master processor, so again the PC main processor never sees the data being handled by this device.

In addition to their expense, their requirement for two expansion slots in the PC, and their interference with control by the host PC, neither of these devices is capable of the data delivery speed necessary for smooth motion display on the PC screen.

The current invention provides, on a single plug-in video card at a much lower cost than either of the above-mentioned devices, smooth video motion at up to thirty frames per second. The current invention not only provides, by its novel data transfer stage, picture data at a much higher rate than either of the above devices, but does so under the master control of the host PC, rather than overriding its processing, as do the two devices mentioned above.

DISCLOSURE OF THE INVENTION

The invention comprises a plug-in computer card on which are disposed an all-channel television (TV) tuner and accompanying circuitry to provide a continuous TV picture which the user can display on a chosen portion of a computer screen. The display is controlled by the computer operator with software provided with the invention in conjunction with the basic operating system for the PC, while the PC is simultaneously used for other processing tasks.

The invention has the capability of providing to a PC for display on its screen an inset or overlay picture. While the mode of processing is essentially unchanged, the invention is available in models providing different capabilities: the frame displayed may be 128×128 pixels in the earlier black and white MicroTV model, the later models (DigiVideo, both color and black and white) provide either 128×128 pixels or 256×256 pixels, depending upon the machine and software with which it is used. Clearly, the larger picture requires four times as many pixels as the smaller, transmitted in the same period of time if real time display is to be achieved, which puts a premium on machine speed and capacity. In those personal computers having sufficient operation speed (e.g. the Macintosh II) this invention makes possible this real time display by transmitting pixels of picture data at a much higher rate than prior art methods.

For use for TV reception, an external antenna is required, and a standard F-type connector is provided. An additional F-type plug is provided for an alternate analog source, such as a video cassette recorder, and RCA pin-plug connectors are provided for separate audio input and output.

This disclosure section will discuss the color model and will reference the numbers on the system block diagram FIG. 1; subsequently the simpler black and white processing will be addressed. For simplicity the description herein will be addressed to TV reception displayed on a Macintosh II personal computer, but one skilled in the art can see how other sources may be substituted, and illustrative changes required for IBM compatible applications will be stated. It is noted, however, that all internal clocking for the DigiVideo processing is derived from the Macintosh 10 MHz clock, so that to use another computer clock changes may be required. It is further noted that in FIG. 1, control lines for the Intelligent Instruments Communications (I2C herein, a registered trademark of Phillips Signetics, a two line system using a clock line and a signal pulse line) system are not shown; instead each element controlled thereby is noted on the diagram in the bottom right corner of the element block.

In summary, the DigiVideo standard plug-in card for the Macintosh II connects with the Macintosh internal processing bus designated as the NuBus. The sequence of processing within the invention and within the host Macintosh computer is controlled by system software resident in a read-only memory (ROM) in the NuBus Driver and Xilinx configuration component 51. When the system is powered, this program loads instructions into the Xilinx field programmable gate array 50, and also loads a NuBus driver program into the Macintosh, for its picture control and decoding operations.

1. The desired channel of TV reception (or FM frequency) may be selected by keyboard control, or with the mouse, using software provided with the invention and installed in the PC. The software provides for tuning the TV tuner by voltage controlled oscillator (VCO), utilizing "look-up" tables for the control frequency for each channel and for the voltage to the VCO to tune that frequency. Frequency control and stability are provided by the phase-locked-loop design of the tuner utilized. The actual tuning, as well as other switching and control operations within the invention, is controlled by use of the I2C control system mentioned above.

The incoming signal from the TV tuner goes to a tuner/IF (intermediate frequency) Processor (21) which comprises two sections. The front end comprises a Phase Locked Loop (PLL) television band tuner which also includes the FM (frequency modulated) radio broadcast band. The tuner utilized in the invention is capable of continuous tuning from 50 to 809 Megahertz (MHz) of television broadcast channels, including frequency modulated (FM) broadcasts only in the FM radio broadcast band.

In the tuner section of this processor, the received RF is converted to a 45 MegaHertz (MHz) IF signal, which in the second section of the processor is detected to obtain an NTSC (National Television Standards Committee) video signal.

The output of the initial processor is directed to a video-audio multiplexer (22), which is essentially an analog switch to provide selection of either video from the tuner-processor or one of the alternate input from the other connector. This selection is again controlled by the I2C serial control system under computer control.

2. The audio signal from the video/audio multiplexer (hereinafter mux) is directed to an audio amplifier (23) and an audio switch (24) which switches it to either an external audio output pin-plug or to an internal speaker on the DigiVideo board. The DigiVideo in its current form does not provide for demodulation and reproduction of standard FM radio broadcasts, but available components could provide this capability.

3. The video is directed both to an NTSC to RGB (red-green-blue) converter or video signal conditioning unit (31) and to a video synchronization (hereinafter sync) signal stripper (33).

The received television signal is processed in the video signal conditioner (31) which demodulates the video signal, and separates it into its color components indicating red, green and blue, the demodulation frequency is crystal stabilized at 3.579545 MegaHertz (MHz). Transfer of color components is controlled by the 10 MHz NuBus clock in the host Macintosh computer, which clock signal controls all DigiVideo functions. In the signal conditioner, and in data transfer, the clock signal is divided according to the frame size selected—If the picture is 256×256 pixels, the storage and delivery clock rate is 5MHz; if it is 128×128 pixels, the clock rate is 2.5MHz.

Each of these color components is sent to one of three identical seven-bit analog to digital (A-D) converters (42, 43, and 44). These signals are also directed to an analog multiplexer 41 which selects either an 8-bit color mode for real time display or a 24-bit color mode for high resolution display.

The video signal conditioner is adapted to demodulate and process either the 3.5MHz frequency band for United States standard TV broadcasts, or the 4.4MHz band for the PAL (Phase Alternate Line) system used in European broadcasts, in which the latter case the crystal reference frequency is 4.43 MHz.

The converter is controlled by a picture attribute controller (32) (again as directed by the host computer through the I2C control lines). This controller is an octal digital-analog controller using direct current (DC) drive level control to control several functions: hue, saturation, contrast and brightness in the television picture, as well as audio volume. The attribute controller also controls the level of a drive signal to (35), a novel picture enhancement circuit.

The video sync stripper (33) extracts the vertical and horizontal synchronization pulses from the video signal and provides them on separate lines to a Xilinx (TM) field programmable gate array with controls the delivery of the output data words to the Macintosh NuBus, as described hereinafter.

The video signal conditioning process includes a picture enhancement circuit 35, also referred to herein as a dither control. The reference voltage and ground from the color component A-D converters (42, 43, and 44) are reintroduced into the NTSC to RGB converter or signal conditioner 31 after digitization in a positive feedback mode (FIG. 2 at 35b). These references carry a noise signal from the digitization which enhances the noise of the color component signals in a random manner. The feedback enhancement is limited by a "dither control" (FIG. 2 at 35a), so the increased noise signal is controlled to that level which will, when converted in the three separate color-band A-D converters, affect the least significant bit of the three (or two) bit signals for the color bands. This least significant bit will then dither, or change state somewhat randomly, so that a color transition in the lower intensity edge of each separate color-band signal will then change in a more or less gradual (and unpredictable) manner rather than by a step change as is characteristic of digital decoding. This sloped rate of change of the lower intensity border or each of the primary colors will produce a varying and somewhat random range of shades within the spectrum defined in the received video signal. Since this dithering of the least significant bit in each of the three color-band signals is gaussian in its distribution, the interaction of the independent signals will cross over the discrete color spot boundaries on the computer video card and produce many more than the standard 256 colors produced by a clean or noise-filtered video signal. Since the eye perceives the thirty-frame-per-second screen display as smooth motion, it will also blend the random variance of the color-edges between the red-green-blue pixels as many more slight variations or shades in color, in a number which cannot be accurately determined.

4. In converter (31), the video picture signal is separated into red, green and blue components. Each of these components is directed to a 7-digit digital-to-analog (A-D) converter (42, 43, and 44) which continuously convert the analog video color component streams into seven-bit digital words, each separate stream defining a color component for display on the PC screen.

The red, green and blue color components (analog) are directed to analog multiplexer (mux, also called a 24-bit frame grab control) 41 which, as directed by system software (gate array transfer control 50 through the I2C link) selects between two color word modes for storage and display (see FIG. 1):

a: In what may be termed the real time (eight-bit color) mode, analog mux 41 directs A-D converter 42 to the eight-bit color mode. In this mode, the green component signal is transferred by analog mux 41 to A-D converter 42, while the red signal goes direct to A-D converter 43 and the blue signal to A-D converter 44. Data buffer 46 continuously accepts eight-bit color words (three red, three green, two blue) and transfers them for storage in video frame memory 47, from which complete video frames are transferred to the host computer NuBus, as described subsequently.

Timing of processing the A-D conversion and storage is based on the vertical sync pulse which begins each TV frame; eight-bit words are read out 256 for each line (in the larger size display) for 256 lines, clocked by the horizontal sync pulse (63.5 microsecond intervals). After a complete frame is stored in video frame memory 47, the computer is signalled and the DigiVideo waits for a command to transfer the picture frame.

b. In an alternative mode providing a slow rate non-real-time display of much higher resolution (and many more color shades), analog mux 41 and data buffer 45 are commanded to assemble 24-bit color words, each of all one color (21 color bits from three seven-bit words, plus three dummy bits). Mux 41 selects the proper color component and transfers it to A-D converter 42, which provides seven-bit color words to data buffer 45 for storage in memory 47. In this mode, an entire frame of red signals is assembled and transferred to the computer, then a frame of green, then of blue. Software provided with the invention for the Macintosh provides for display of a resultant high-resolution color frame at a slow repetition rate, in what might be considered a freeze frame mode. It might be noted that the dither circuit has very little effect in this color mode.

5. Data transfer to the PC is controlled by the Xilinx programmable gate array, according to instructions loaded at power on as initially described.

a. When a complete TV picture has been assembled in the memory, the DigiVideo transmits a signal to the PC processor that a picture frame is ready.

b. When the main PC program is ready to read the picture for display, it addresses the DigiVideo by a signal known in Macintosh language as "myslot", initiating data readout from that source in time intervals of 500 nanoseconds |ns| each.

c. During the allotted 500ns interval, the MicroTv Receives a clock signal every 100ns from the Macintosh PC: On the "myslot" pulse, the controller in the invention's novel data transfer stage directs transfer of video data from the RAM to four output registers or buffers, the first three of which are uni-directional latched buffers, the fourth being bi-directional. On each of the four successive clock counts at 100 ns intervals, an eight-bit data word describing a pixel of information is transferred in parallel into one of the four eight-bit output registers, in order. On the fourth clock pulse in addition to loading the data word in the fourth buffer, the controller directs output in parallel of all four words to the PC which accepts them in correct order as one 32-bit word for Macintosh processing. The DigiVideo then acknowledges and signals ready again.

d. The PC continues to address the DigiVideo under its program control, each sample time being 500 ns, during which time four pixels are transferred as described in 7 above, the sample rate being determined by program rate and relative priority, as described below. When the complete picture has been read, the MicroTv assembles another complete frame in its RAM, signals the PC that a complete picture is ready and the process repeats under control of the PC program.

To read out data for a 128×128 pixel array, the above-described 500ns readout cycle must occur 4096 times per complete picture frame, or 122,880 times per second, which amounts to slightly over six one-hundredths of a second (or 6% of machine time) consumed in this data transfer process. For a display array of 256×256 pixels, these numbers are correspondingly 16384 times per picture frame, or 491,520 times per second, approximately 24% of machine time. Internal PC processing time is additional, and display of the picture may consume a significant part of the PC operating cycle, particularly for the 256×256 pixel picture.

The data output transfer sequence (DOT for short) is precisely the same in the color and in the earlier black and white models. In the earlier models, readout and storage control is exercised by a PAL (programmable array logic) which has the control sequence permanently "burned" in. See below for code. In the color model, as described above, a Read Only Memory (51) supplies the program both to the gate array circuit 50 for internal control and to the computer as a NuBus driver. Communication with the Macintosh are through a bi-directional buffer 55—see FIGS. 3 and 5.

Original IBM machines used either an eight-bit or sixteen-bit word, however computers appear almost daily with increased speed and capacity.

For example, the original IBM PC, using eight-bit words at 4.77 megahertz (MHz) operating speed, could only read one word at a time, so the multi-word output buffer circuit would not help. That particular machine could not display a real time picture. Internal PC processing, not included in this invention, could provide a slower than real time picture display. Later models of IBM machines operate at high speeds and have progressed to longer operating words, which could provide real time display.

Other computers recently appearing on the market feature greatly higher operating speeds and some besides the Macintosh now use thirty two bit words, so the preferred mode of the invention described herein could be directly adaptable to them, depending on internal logic, clock frequency and processing mode.

Again, internal machine processing time for display must be considered to determine utility of the process.

A logic difference between the two types of machines requires attention. A Macintosh reads zero as "white" on its video card, while IBM reads a digital one as white. So the A-D converter in different versions of the DigiVideo must accommodate this logic inversion.

BRIEF DESCRIPTION OF THE DRAWINGS

FIGS. 1, 1a and 1b are block diagrams of the invention in its color DigiVideo version, adapted as a data flow diagram, showing all components of the invention mounted on the plug-in card, with the exception of the card connector to the PC, which is shown in FIGS. 3 and 5.

FIGS. 2, 2a and 2b are circuit diagrams of a portion of the video demodulation and conditioning circuitry with that portion constituting the dither circuit indicated.

FIG. 3 is a block diagram of the novel data output circuit of the invention in its color version form, providing the capability to transfer the picture to the host PC in real time if the PC is capable of that speed.

FIG. 4 is a block diagram of the black and white version of the invention, analogous to FIG. 1.

FIG. 5 is the black and white version of the data output circuit.

FIG. 6 is the software flow diagram for operation of the DigiVideo and its readout by the Macintosh PC.

In FIGS. 1, 3 and 5 double lines indicate digital data transfer in parallel; data transfer is indicated on FIG. 4.

DESCRIPTION OF THE PREFERRED EMBODIMENT

This detailed description will apply to the color version of the invention specifically adapted to the Macintosh II or subsequent models in that series. Adaptability of the invention to the IBM type machines has been indicated hereinbefore, but will not be discussed in detail.

The operation of the DigiVideo is controlled by software provided with the machine. The flow diagram of operations is shown in FIG. 6, and the entire software program, which is in Read Only Memory (ROM) in NuBus driver and Xilinx configuration controller 51 is attached hereto as Appendix 1.

Referring first to FIG. 1, at the right of the figure the number 10 represents signal sources for the invention described herein, as well as an audio output monitor. At 11 is indicated connection of an antenna for reception of a standard TV broadcast signal, at 12 an alternate signal source, such as a video-cassette recorder, closed-circuit TV, or other analog source whose signal characteristics are compatible with analog TV signal processing. Also indicated are provisions for an external audio source 13 and an external audio monitor 14 which may be used by the invention. By external switching, not a part of the invention, more than one alternate source may be used.

Signal sources 11 and 12, are connected to the invention through F-type connectors, 13 and 14 by RCA pin-type connectors. These connectors are on the frame edge of the computer card 20 on which the invention is disposed. This is a standard card for the Macintosh II or subsequent models of that series of computers. The card dimensions are 4×13 inches (10.16×323.02 mm), with a 96-pin connector, indicated at 28, mating with the PC.

On the plug-in card 20 are disposed the elements of the color DigiVideo, which will be specified by part numbers. Additional discrete circuitry for voltage control is according to standard practice known to one skilled in the art.

A. A first processing stage, comprising an all-channel standard TV tuner combined with an intermediate frequency (I/F) processor 21, UV936, Phillips;

a switching control unit or video/audio multiplexer (mux) 22, TDA8440N;

an audio chain consisting of an amplifier 23, LM324AD, an audio switch 24 and a miniature loudspeaker 25, both of standard design, and an audio output plug;

B. A video processing stage:

video signal conditioner (NTSC to RGB converter) 31, TDA3567N;

picture attribute control 32, TDA8444N, which also provides audio volume control and a novel "dither" circuit (35) see FIG. 2 and discussion;

a differential voltage control 34, LM78L05, which supplies reference voltage (2 volts) for the analog to digital conversion;

C. Analog to digital conversion and storage stage;

a 24-bit "frame grab control" 41, 74HC4051, which selects, on command, either an 8-bit real time color mode or a slower 24-bit high resolution color frame display;

three identical seven-bit digital-to-analog (D-A) converters, 42, 43 and 44, (MC10321), one each for red, green and blue color signals;

a data buffer 45, 74LS540 which transfers the color data frame to the RAM storage memory if the 24-bit color mode is selected;

a data buffer 46, also 74LS540, which transfers the color data to the RAM storage in the eight-bit mode, which is standard PC video color of three red bits, three green bits and two blue bits;

a video frame memory (RAM storage) 47, 43256-100, which stores a full video frame for readout to the PC;

D. The data transfer (data output transfer, or DOT) stage which delivers color data words to the computer;

a Xilinx field programmable gate array 50, XC2018PC84-70, which follows instructions loaded therein on power-up, and controls the operations of the DigiVideo, including data delivery (also referred to as a controller);

a NuBus driver & Xilinx configuration ROM 51, NS27C64-200. This circuit holds the instructions for gate array 50 as well as the software program for the Macintosh PC. On initial power-up of the DigiVideo, gate array 50 is configured and, on request from the PC, the NuBus driver containing all DigiVideo interface instructions is loaded therein through bi-directional buffer 55.

uni-directional data buffers 52, 53, and 54 (each 74F534) and bi-directional buffer 55 (74ALS640), which deliver four eight-bit words to the PC at one time as a 32-bit data word. These buffers are identical in the color and black and white versions of the invention.

Referring to FIG. 2, a portion of the circuitry including NTSC to RGB processor 31 is shown. The novel dither control of the invention, the operation of which has been described in general above, is indicated herein at 35a and 35b.

The ground and reference voltage from the three color component A-D converters 42, 43 and 44, which after signal processing in those converters are now carrying a noise signal, are reintroduced into signal conditioner 31 as indicated at 35b. This noise signal, in a positive feedback mode, will cause the three color components to vary, or "dither" somewhat randomly, since the noise is gaussian in distribution. The dither control voltage signal, introduced through the network shown at 35a, to the filter and peak elements of the signal conditioner, limits the amount of variation allowed in the signal to that level which will, as previously summarized, cause the least significant bit to vary randomly. This dither is effective in the eight-bit color mode, but much less so in the 24-bit high resolution mode.

Referring to FIG. 3, the elements of the invention's novel data transfer and control stage are shown to explain the operation of the device. Also shown, designated 28, is the 92-pin connector which mates the card to the Nubus in the Macintosh II PC. In FIG. 3, double lines represent data transfer in parallel over eight lines for the eight-bit words used to define picture pixels. The ultimate bit numbers for the final 32-bit word transferred to the Macintosh II are indicated by the corresponding pin numbers on connector 28 to which they are addressed, in four-bit groups (AD0, AD4, etc, through AD28). Control signal flow is shown in lighter lines.

Other than the four signals marked at the top of the figure, data transfer between the Macintosh and the DigiVideo are through bi-directional buffer 55.

The elements of this novel input-output control and data transfer device are stated above.

Communication of the invention with the PC is through connector 28. The following signals are required for control and data transfer:

a signal called NMRQ (non-maskable interrupt data request), is sent by controller 50 to the PC via pin 31 of connector 28, to inform the PC that a complete picture frame is ready in the RAM for transfer;

the signal called "myslot" in Macintosh language, is received by the invention (controller 50) on pin 92;

the clock signal (every 100ns) is received on pin 96 to go to the controller 50, and provided by the controller to the other elements of the DigiVideo which are clock synchronized;

the "ready" or "acknowledge" is returned on pin 28;

address code and I2C control signals are received on the eight pins designated which communicate with bi-directional buffer 55 (pin-pairs 82 & 18, 83 & 19, 84 & 20 and 85 & 21). The eight-pin data bus as designated on FIG. 2 goes to the memory 47 and the IIC controller 27 shown in FIG. 1, previously described.

On "myslot", controller 50 directs transfer of four eight-bit words, each defining one pixel of picture information, from the RAM 47 to the four output buffers or registers 52 through 55 inclusive.

The controller switches "myslot" and counts and switches the first three clock signals in succession to registers 52, 53, and 54. On each clock pulse one eight-bit word is loaded in parallel into the register addressed by that particular clock pulse. On the fourth clock pulse the controller 50 switches the data flow direction for register 55 to output and directs loading of the fourth data word in that register in parallel. On that same fourth clock pulse controller 50 sends the output enable signal to all four registers and the four eight-bit data words are read out to the PC in parallel over the thirty-two lines previously designated and shown in FIGS. 3 (and 5). The controller also sends the "acknowledge" or "ready" signal back to the PC over pin 28, which signal means that four-word data transfer operation is complete and the invention is ready for the next "myslot", at which time the data transfer sequence just described is repeated until an entire frame is read out.

When the entire picture frame has been read out, controller 50 directs storage in the RAM 47 of another frame. When the next frame is assembled, the controller 50 notifies the PC (by sending NMRQ) that it is ready and waits for the next "myslot". The signal flow and operation has been previously described under the disclosure of the invention, with control of internal operations being directed as previously described by the I2C control system.

VERSION OF INVENTION FOR BLACK AND WHITE PICTURE

The invention comprises a plug-in computer card of the same characteristics as previously described for the color version of the invention, and general observations made there apply herein.

The invention has the capability of providing to a PC for display on its screen a continuous black and white inset or overlay picture, as controlled by the operator through the PC with software provided with the invention. While the mode of processing is essentially unchanged, the invention is available in two models providing different capabilities: the MicroTV provides a display of 128×128 pixels; the DigiVideo version has a switchable output to provide either 128×128 pixels or 256×256 pixels, depending upon the machine and software with which it is used. This discussion is primarily addressed to use with the Macintosh II series of computers.

The input connectors are as previously described for the color version, as is the basic processing chain, except that it is simpler for a black and white picture. The system elements are largely discrete circuits available, with external networks of standard design to provide proper functioning.

In summary, referring initially to FIG. 5, the MicroTV standard plug-in card for the Macintosh II connects with the Macintosh internal processing bus designated as the NuBus. The sequence of processing within the invention includes the following steps:

1. The desired channel of TV reception may be selected by keyboard control, or with the mouse, using software provided with the invention and installed in the PC. The software provides for tuning the TV tuner by voltage control oscillator, utilizing "look-up" tables for the control frequency for each channel and for the voltage to the VCO to tune that frequency, actual control of the tuner being through the I2C controller 64 (74LS378), using a clock line and a signal pulse line. The tuner is a commercially available component, Samsung EBC-1731AL. The tuner or alternate source signal is switched by a switching network 27, of discrete circuitry of standard design. The audio signal included in the TV or other source signal is received separately from the tuner or RCA pin-plug and is routed to either an internal miniature speaker mounted on the card or to the output pin plug mentioned above.

The audio speaker is a standard miniature, of which many are available.

Frequency control and stability are provided by the phase-locked-loop design of the tuner utilized.

2. The video component is switched to a video signal conditioning circuit 36 (a combination of discrete circuitry and standard chips, comprising essentially a low-pass filter limiting the signal which passes through to that portion of the TV picture signal below 3.5 MHz). This signal processor strips the signal of any components other than its luminance (black and white) elements, to restrict the signal to the gray scale section of the PC video card.

3. An analog-to-digital (A-D) converter 48 (MC10321) continuously converts this processed analog signal to digital format. The encoded 8-bit digital words (each representing one pixel of video display coded for the necessary gray scale area signal from the PC video color card) are stored temporarily in internal random access memory (RAM) 26 (43256-100), prior to readout by the novel data output transfer section of the invention, which functions in the black and white version precisely as previously described for the color version, except that its control elements are less flexible. In the smaller model of the invention, called the MicroTV, which is capable of providing a 128×128 pixel array to the PC, this RAM storage uses about half of a standard 32 kilobit (32K) matrix. The DigiVideo model, which provides a 256×256 pixel array, uses two 32 kilobit matrices for storage.

Referring to FIG. 5, the invention's novel data transfer and control stage for the black and white model, which was indicated as 60 in the system block diagram FIG. 5, are shown to explain the control of this version of the device, which functions exactly as described previously for the color version. Also shown, designated 28, is the 92-pin connector which mates the card to the Nu-bus in the Macintosh II PC. In FIG. 5, double lines represent data transfer in parallel over eight lines for the eight-bit words used to define picture pixels. The ultimate bit numbers for the final 32-bit word transferred to the Macintosh II are indicated by the corresponding pin numbers on connector 28 to which they are addressed, in four-bit groups (AD0, AD4, etc, through AD28). Control signal flow is shown in lighter lines.

The elements of this novel input-output control and data transfer device are, in addition to a programmable array logic state machine or controller 31, a 2-bit counter 62 (74F163), a 2:4 demultiplexer 63 (74F139), three unidirectional eight-bit latched data registers or buffers 52, 53, and 54 (74F534) and a bi-directional eight-bit register 55 (74F640). The logic state machine 31 is part No. PAL 16R4, which is configured by having its switches "burned" by a program, for which see below.

Communication of the invention with the PC is through connector 28. The following signals are required for control and data transfer:

a signal called NMRQ (non-maskable interrupt data request), is sent by controller 61 to the PC via pin 31 of connector 28, to inform the PC that a complete picture frame is ready in the RAM for transfer;

the signal called "myslot" in Macintosh language, is received by the invention on pin 92 and is routed to both the controller 61 and the 2 bit counter 62;

the clock signal (every 100ns) is received on pin 96 to go to the controller 61, and the 2-bit counter 62, it is also provided by the controller to the RAM 49 for synchronization;

the "ready" or "acknowledge" is returned on pin 28;

address code and I2C control signals are received on the eight pins designated which communicate with bi-directional buffer 55 (pin-pairs 82 & 18, 83 & 19, 84 & 20 and 85 & 21). The eight-pin data bus as designated on FIG. 2 goes to the memory 26 and the I2C controller 64 shown in FIG. 4, previously described.

On "myslot", controller 61 directs transfer of four eight-bit words, each defining one pixel of picture information, from the RAM 49 to the four output buffers or registers 52 through 55 inclusive.

Two-bit counter 62 receives "myslot", and then the four clock signals, which it routes in succession to the 2:4 demultiplexer 63. The demultiplexer counts and switches the first three clock signals in succession to registers 52, 53 and 54. On each clock pulse one eight-bit word is loaded in parallel into the register addressed by that particular clock pulse. The fourth clock pulse is switched by the demultiplexer 63 back to the 2-bit counter 62, which turns off.

On that fourth clock pulse the controller 61 switches the data flow direction for register 55 to output and directs loading of the fourth data word in that register in parallel. On that same fourth clock pulse controller 61 sends the output enable signal to all four registers and the four eight-bit data words are read out to the PC in parallel over the thirty-two lines previously designated and shown in FIG. 2. The controller also sends the "acknowledge" or "ready" signal back to the PC over pin 28 of connector 28, which signal means that four-word data transfer operation is complete and the invention is ready for the next "myslot", at which time the data transfer sequence just described is repeated until an entire frame is read out.

When the entire picture frame has been read out, controller 61 directs storage in the RAM 49 of another frame. When the next frame is assembled, the controller 61 notifies the PC (by sending NMRQ) that it is ready and waits for the next "myslot".

The system output controller 61 is a programmable-array-logic (PAL) module, configured to direct the sequence of operations described previously by a PAL programmer in accordance with JEDEC code set forth immediately following:

---

ABEL(tm) 3.10 Data I/O Corp. JEDEC file for: P16R4 V7.0
Created on: 8-Nov-89 08:38 AM
AAPPS MACTV
NuBus state control pal - - p/n MTV-1 Revision 1.0*
QP20* QF2048*
L0000
11111111111111111111111111111111
11101111111111111111111101110111
11111111110111011011101011111111
11111111101111011011010101111110
00000000000000000000000000000000
00000000000000000000000000000000
00000000000000000000000000000000
00000000000000000000000000000000
11111111111111111111111111111111
11111110111111111111111101110111
11111110111111101111111101111111
11111111101011001010101011111011
00000000000000000000000000000000
00000000000000000000000000000000
00000000000000000000000000000000
11111111101111011011100111111111
11111111101111011011101110101111
00000000000000000000000000000000
00000000000000000000000000000000
00000000000000000000000000000000
00000000000000000000000000000000
00000000000000000000000000000000
00000000000000000000000000000000
11111111101111011111111101111111
10110111101111111101110101111111
00000000000000000000000000000000
00000000000000000000000000000000
00000000000000000000000000000000
00000000000000000000000000000000
00000000000000000000000000000000

-continued 00000000000000000000000000000000
11111111110111101110110101101111
11111111110111101010011001111111
00000000000000000000000000000000
00000000000000000000000000000000
00000000000000000000000000000000
00000000000000000000000000000000
00000000000000000000000000000000
00000000000000000000000000000000
11111111100101011110101101111
11111111110111011011101011111111
00000000000000000000000000000000
00000000000000000000000000000000
00000000000000000000000000000000
00000000000000000000000000000000
00000000000000000000000000000000
Aapps MicroTV & DigiVideo PAL Jedic Listing May 14, '90
00000000000000000000000000000000
11111111111111111111111111111111
11111111111111111111111101100111
11111111111110111111111101101111
11111111101101001011001011111011
00000000000000000000000000000000
00000000000000000000000000000000
00000000000000000000000000000000
00000000000000000000000000000000
11111111111111111111111111111111
11111111111111111111111101110110
11111111111110111111111101111110
11111111101101001011001011111011
00000000000000000000000000000000
00000000000000000000000000000000
00000000000000000000000000000000
00000000000000000000000000000000*
C5067*
B9FF

---

The above disclosure of my invention, including the special data transfer circuit and its novel programmed control circuit, is considered the best mode for carrying out its function. Minor variations are considered to be within the scope and limits of the invention, as defined in the claims set forth below.

Aapps Corporation

DigiVideo™ Color

NuBus Driver
&
Xilinx Configuration ROM

Rev. 2.0.1

```
000000  FF 04 20 BA FB 2E FF 3F-FF FF 7F 6F FC F6 FC FF   .. ....?..#o....
000010  B7 F1 FD F1 FA FF DB D7-B7 8F FF BF FF F7 F7 EF   ................
000020  FB EB DB DF 8F D3 FF 9D-FF BF FF FB FF FF 7A FF   ..............z.
000030  FF F7 EF EF DD FD FB 5A-5B FF 77 FF F5 7F FF 6F   .......Z[.w..#.o
000040  FF DF FF DF FF BE BF AA-FF FB FF F7 DB FD FF FD   ................
000050  FD FB FB F9 DF FF FF FF-BD FF F7 FF DF DF DF FF   ................
000060  F6 FE FF BE FF DF 9D EF-FF EF BF F7 FD FF F6 F8   ................
000070  FD FD FF FF FB DB BF B5-BF F7 6F FF EB FF FF FE   ..........o.....
000080  DE EE FD BF BF 7F BF 7F-FF FE F6 FF FE EE EF EF   ......#.#.......
000090  FD DB FF FB FF FF BB F7-7D E6 EF 7B FB CF FF BF   ........}..(....
0000A0  9F A7 FF FF 73 FC FF FE-79 FF DB FF FF FF FA 9F   ....s...y.......
0000B0  FB F2 8F FE E7 77 E5 CB-C7 BF FF DE DD FF F9 BF   .....w..........
0000C0  9F 7B 77 7F FF 7F F7 FE-FF DE FD 7F 3D FF BF 3F   .(w#.#.....#=..?
0000D0  FB 3F FF FF FF FD FD F7-FF FF FD F5 F7 3D 1B BB   .?...........=..
0000E0  79 76 76 F6 EE EC FC F6-EE ED EC ED D9 DB 13 B1   yvv.............
0000F0  B7 B7 B6 7F FF FF F9 FB-EF FF FF EF FF EF FF 5B   ...#...........[
000100  37 67 F7 FE FE FE FD FD-FC FD 9D DF DF 5D BD BF   7g...........]..
000110  BC 7F 7E 7B 7F FE 5C 5B-5F FF F6 DE 7E 6D AD 7D   .#~(#.\[_...~m.}
000120  3D F7 FF 7F FF DF CF DF-9F BF FF 5F BD 7D FE 7D   =..#........_.).}
000130  EF EF EF FF FF D7 FF ED-FD FF 3F FF FB FE FF F5   ..........?.....
000140  F5 F7 DF 6E FF FF FD FF-DF FF BD BF FE BF 7F F7   ...n...........#.
000150  F7 E9 FF EB FE AF DD F7-F7 AF FB FF FF BF FF F7   ................
000160  FF EF FF FF DF FF FF EB-BE DB FF 7F 7F 69 FB      ............##i.
000170  FF FE FF DF FF BF DF EF-DE 5F FF FF F7 FF FF F0   .........._.....
000180  EE C9 FF B3 B7 33 EF BF-FF FB F6 FF F7 FA F7 6D   .....3.........m
000190  CD CF DF FD FF BF FA FF-BD FF AE FB FF FE CF FF   ................
0001A0  FF FF FD FE FE FA FE FD-F9 7D FF 7F DB FE 8E FD   .........}.#....
0001B0  BE 29 6B F9 BF FB FF 5F-FF FF CE FF CD FF ED ED   .)k...._........
0001C0  DF FF FF FB FF F7 FD FD-6F 6F FF EF E9 FF F4 FF   ........o.......
0001D0  F7 FF 6F FF 7F 77 6F F7-7F FF FE FF FD FE FB FE   ...o.#wo.#......
0001E0  D9 D9 BF FE FF D7 FB BF-FF 5F 7F 7B 7F DB F5 FF   .........#(#...
0001F0  BF E3 DF F7 FF ED E7 FB-E3 EE FF EE F9 FD F7 FF   ................
000200  FB 6D FF FF 7B FF EF 4F-9F EE FE BE FD BD FD FF   .m..(..O........
000210  FB 5F 7E FF FE FF F7 EF-EF FD FF DE FF 5B 5A F6   ._~..........[Z.
000220  FE BE FE FD ED ED EF EE-DF DF AB DF 9F 7F 3B 6B   ............#;k
000230  7F FF F7 BF FA F2 EF ED-AD DF DB DF FB BF FF EF   #...............
000240  F5 9D EF EF 9F DF AF DF-FF FD 3D 7E BF 7B 56 FE   ..........=~.(V.
000250  FC FC DF FD 6F FF DD FD-FF DB FF FE FF FF FB 77   ....o..........w
000260  FF AF B8 DE FF FF FF FF-FF DF F3 DF DF 3F DF      .............?.
000270  FF BF FF FF FF FF DF FF-F7 F3 AF EF 6F DF DF FF   ............o...
000280  DF EF FE BF FF 2F BD BD-7D 7A FB FA FB F7 BF BE   ...../..)z......
000290  FE FD FC 3C FB FA FE FB-3F FB F7 F7 FB EF E7 FF   ...<....?.......
0002A0  DF FF CF DF F9 BF BB 7F-6B 6B FB D6 F6 F6 F6 EF   .......#kk......
0002B0  BF F4 F5 EF 6F ED DE DF-D7 D7 77 FF 4B EF 7F 7F   ....o.....w.K.##
0002C0  7F FD DE B4 F6 F6 CB 7F-7F 7A FA FF FF 7C FF FC   #......##z...|..
0002D0  FF DE FF DF DF B7 FF F7-FF FF FF FF EF FA EF EF   ................
0002E0  FF DF DD FD BF BF FF FF-E7 FF FC FC EE FB FF DD   ................
0002F0  FF DB FB BF FD B7 F7 DF-7B FD FF BF BE DE DF FD   ........(.......
```

| | | | | | | | | | | | | | |
|---|---|---|---|---|---|---|---|---|---|---|---|---|---|
| 000300 | B7 | A5 | 6D | EB | DF | FF | FF | DF-9F | FE | EF | FF | FF | FD | 7E | DF | ..m...........~. |
| 000310 | FF | FF | FF | F7 | F7 | 7D | B7 | AB-AD | 7F | 76 | FF | FF | FD | B7 | B5 | .....}...█v..... |
| 000320 | FF | FB | 7F | 5F | DF | FD | FE | 7F-7F | 79 | 7F | FD | DF | FF | B2 | F3 | ..█_...██y█..... |
| 000330 | 47 | 6F | FF | FE | CF | DF | EF | FF-FC | DF | DD | FD | FB | FA | FF | FF | Go.............. |
| 000340 | 7F | 7F | 7F | F7 | 7A | AB | B3 | B5-F7 | FF | FF | F9 | FF | FF | 3F | 7D | ███.z.........?) |
| 000350 | FF | FF | F7 | FF | FF | EE | FD | FF-FF | DF | D9 | 3F | 1B | 7B | FA | F2 | ...........?.{.. |
| 000360 | FF | BF | C6 | F4 | FE | EE | FD | FD-FD | 75 | FF | FF | FF | B7 | BF | B7 | ..........u..... |
| 000370 | 7F | EF | EF | EF | FB | FF | FF | EF-BF | FD | BF | FF | F3 | 7F | 77 | FF | █............█w. |
| 000380 | FF | FF | DF | BF | DD | 7D | FD | 9D-7E | 79 | BB | F6 | FF | FA | FA | EB | .....}..~y...... |
| 000390 | 6F | 6F | FB | 5A | 5F | 7D | FB | FE-FE | EF | 5F | FD | 7D | 3D | E7 | FC | oo.Z_}...._.}=.. |
| 0003A0 | 76 | EE | 7B | DF | EF | FF | EB | E7-EB | 3C | FF | E7 | A7 | FF | DE | F6 | v.{......<...... |
| 0003B0 | FF | DF | DF | DF | FE | FD | 3D | 2F-7F | FB | 7F | 3B | F7 | FF | F7 | D7 | ......=/█.█;.... |
| 0003C0 | EF | FF | 6F | FD | D7 | D7 | FF | BE-FB | FD | FF | 7F | EF | 6F | 7D | FB | ..o........█.o}. |
| 0003D0 | FB | FE | FB | A7 | F7 | D7 | DD | DB-7F | 7F | FF | F6 | F7 | FF | FF | BD | ............██.. |
| 0003E0 | FD | FF | DF | D9 | 7E | FB | FF | F7-B7 | EF | ED | 67 | EF | EF | FE | FF | ....~......g.... |
| 0003F0 | 57 | 77 | 7C | FE | 7F | 7B | 7F | 5F-3B | F7 | EA | 6C | FC | EA | BB | E1 | Ww|.█(█_;..l.... |
| 000400 | B3 | D7 | F9 | F3 | BF | 77 | 77 | D7-BF | AD | 6F | DB | FD | FF | DD | DF | .....ww...o..... |
| 000410 | BD | B3 | BB | 76 | 75 | 6D | FF | 9F-FF | 2F | BF | CF | DF | FE | FF | FD | ...vum.../...... |
| 000420 | FF | BF | FF | FF | FF | FF | 77 | F7-EE | CF | BE | FC | FD | 7D | 7B | FB | ......w......}{. |
| 000430 | 7D | FF | FB | 7A | FA | FF | 7D | FF-F5 | ED | AF | ED | DF | FE | FA | FF | )..z..)......... |
| 000440 | 7B | FE | F7 | FF | EA | EB | EF | EF-FF | FC | DC | DF | FB | BB | EB | 7B | {..............{ |
| 000450 | 7F | 6F | 5F | 5F | F7 | 6E | FE | 7E-FF | FF | ED | 5A | DB | 9B | DB | BF | █o__.n.~...Z.... |
| 000460 | F6 | 16 | D2 | AF | BD | AD | 7F | 4F-7F | 7B | DF | 9D | FF | 9E | 7B | FE | ......█O█{....{. |
| 000470 | 7F | ED | EB | AB | BB | F3 | 8E | ED-F5 | E9 | 5D | F7 | FB | 3B | FE | FF | █..........]..;. |
| 000480 | FF | 79 | D7 | FF | 47 | CF | FF | BE-FF | FD | FF | FD | DD | 73 | FB | 5F | .y..G........s._ |
| 000490 | DF | 7C | BF | F7 | FF | FF | FF | F9-DD | DB | 7F | DF | BF | FF | BF | FF | .|...........█.. |
| 0004A0 | E5 | E9 | E5 | EF | F6 | FE | FF | FF-FF | BF | 7D | 7F | 5F | FF | BF | 77 | ..........)█_..w |
| 0004B0 | 7F | FF | 72 | FF | EF | FF | FB | FB-F9 | FF | BF | C7 | FF | F7 | BB | F7 | █.r............. |
| 0004C0 | 8F | DD | 8E | DF | 5E | DE | 3D | FF-7F | BB | FF | 7F | F6 | FC | ED | FD | ....^.=.█.█..... |
| 0004D0 | 7C | CF | BF | FF | BF | EF | FE | BA-FD | 7F | FF | FB | 75 | EF | FF | BF | |.........█..u... |
| 0004E0 | 5E | FD | D7 | F4 | DF | FF | AF | FF-F3 | FF | F7 | FF | FF | FF | FF | FF | ^............... |
| 0004F0 | FF | 7F | FF | 9F | 9F | FF | F7 | 6D-BF | F5 | DB | DE | DB | FE | EF | BE | .█.....m........ |
| 000500 | FE | FF | 3F | BF | BF | 3D | FB | FA-7B | B7 | 7F | BF | FE | BD | FF | | ..?..=..{..█.... |
| 000510 | ED | 7A | 79 | FB | FB | 3F | 3F | FE-F7 | FF | FE | 6F | DF | CF | DF | DD | .zy..??....o.... |
| 000520 | DB | B9 | DF | BF | F7 | BF | 5F | AF-F6 | F6 | B6 | AE | F5 | BF | F6 | | ......_......... |
| 000530 | EF | FF | EA | DF | D3 | D7 | 5A | 7F-29 | FF | 6B | F7 | FF | 5F | FB | EA | ......Z█).k.._.. |
| 000540 | FC | EE | FC | 6B | BD | 7B | 5A | B5-FF | 6E | FF | 9F | FE | FF | DF | FB | ...k.(Z..n...... |
| 000550 | FF | DF | B7 | F7 | BF | FF | EF | FF-FF | FF | FC | FF | FF | FF | FF | DF | ................ |
| 000560 | DD | FF | BF | FF | 7F | E7 | F5 | FF-7E | FE | ED | FD | DF | F7 | DF | D7 | ....█...~....... |
| 000570 | BF | BF | A7 | E7 | 7F | 5B | CB | FF-FF | FE | FF | FA | F9 | B7 | FD | FF | ....█[.......... |
| 000580 | FB | FB | BF | 7F | BF | DF | F7 | EE-EC | EF | FF | DB | DB | FF | FF | BD | ...█............ |
| 000590 | FD | FD | 7F | AE | FF | FF | DF | DF-EE | FF | FD | FE | DD | EE | E3 | 7A | ...█...........z |
| 0005A0 | DF | FD | BE | 7F | FF | FF | FF | FF-EF | DC | C7 | 8B | FF | E3 | EF | DF | ...█............ |
| 0005B0 | FF | DF | FF | DF | FF | DC | F5 | EF-EF | B7 | FF | DF | FF | DF | FF | 5F | ...............\_ |
| 0005C0 | F7 | EA | DE | D6 | 7F | BF | FD | FF-EF | FF | EF | 3F | FE | FD | 7F | FB | ....█......?..█. |
| 0005D0 | FC | FF | E6 | FF | FF | FF | DF | B9-BB | BF | FB | 76 | FE | FF | FF | EC | ............v.... |
| 0005E0 | FF | FC | EE | FD | ED | ED | DF | DF-D6 | FF | FB | FF | FB | 7F | EF | 6E | .............█.n |
| 0005F0 | E7 | FF | EE | FF | F6 | FF | E7 | FF-FF | 73 | 6F | 7F | FB | DF | 7E | FF | .........so█..~. |
| 000600 | FF | DE | FF | DE | 9D | FB | FB | FB-FE | B7 | F7 | FF | FD | FF | FD | FB | ................ |
| 000610 | 5A | DF | 4B | EF | FC | BE | DE | FF-FD | FF | 7D | F7 | BD | 7A | E2 | 5F | Z.K.......}..z._ |
| 000620 | EB | F5 | FF | FF | FE | FE | 3F | 79-F7 | F7 | 77 | EF | ED | FF | BF | FB | ......?y..w..... |
| 000630 | BF | FD | 3D | 9D | 7F | 7D | FF | 7B-FE | FF | FF | FF | FF | EF | 7D | FB | ..=.█).(......). |
| 000640 | BF | F3 | FF | FA | FF | FF | FF | FF-7D | FF | FD | EB | DD | EF | EF | F7 | .........}...... |
| 000650 | FF | EF | FF | BF | FB | 6F | FF | FF-FE | FE | BF | FF | 7F | FF | FF | 9F | ....o......█... |
| 000660 | CF | FB | DF | F7 | B5 | F7 | FB | FF-FF | FF | FF | BC | FF | 7F | 37 | BF | ..............█7. |
| 000670 | BF | FF | FF | FF | FF | FF | E7 | F5-6F | EE | 92 | D9 | E9 | FD | FF | FF | ........o....... |
| 000680 | FF | 3F | 7E | 75 | 5F | FF | FE | AF-FF | F7 | FF | F7 | DF | F5 | EE | AF | .?~u_........... |
| 000690 | 7A | FF | F7 | FD | 77 | FF | FF | FF-CF | 7F | BF | BF | FD | FF | FE | FB | z...w....█...... |
| 0006A0 | FF | FF | FF | 7F | 5F | EF | DF | D7-BD | 9C | FD | DF | FF | FF | BF | FB | ...█_........... |
| 0006B0 | FE | 6B | FF | F4 | D7 | FE | FE | FF-FF | FF | DF | FE | DF | FB | F7 | 3F | .k............? |

```
0006C0  F5 FB FF FF FF FF FC DF-DB BF DF BF EF EF FF FF   ................
0006D0  7F E7 7F B6 FF EF FE BF-7F FF FD FD BE 5F DE D7   ............._..
0006E0  BE 3D BF FF FF FF FF DF-99 7F BE FF F5 7F F7 77   .=.............w
0006F0  FF FF FF AE F8 CD 99 85-FF F3 FF BF FF FF 7B EC   ..............{.
000700  FF CF CF DF B6 AF 7D FF-FF FF 7B FB 5A FF F7 F6   ......}...{.Z...
000710  F7 F9 EF FF FF DD 7B 7E-D9 BE B3 FF EF 75 F7 FB   ......{~.....u..
000720  FF CE CE DE FF FD DD 6D-EF CF DF EF F7 FF 7F FB   .......m........
000730  FF EC F7 DB 6D FF FD BF-CD EB F7 EF E7 FB 9D FF   ....m...........
000740  FF FF FF FD 7F 3F BF 76-F5 76 E8 AD FF FF CF FF   .....?.v.v......
000750  DD 1D BF BB BF 7D 7F FF-FE 77 EF EE BF FE DD 7D   .....}...w.....}
000760  BD DD FE FF FF F3 FF FF-DF CF FF FF FF BF FF FF   ................
000770  9F 3D 5B D3 EF 2E E4 FF-CE 7C FF EF BE DE DE FF   .=[......|......
000780  7D FD EF DA FF BF FF F7-EF 76 FE ED ED FF FF FF   }........v......
000790  FE BF BF BD F7 F3 EF FD-FF FF E8 FF FF DF B9 BF   ................
0007A0  BF FB F7 F7 BF FE FF FF-FF 4F 3D 95 B4 CE CA 6F   .........O=....o
0007B0  D7 DB FD FF 73 EF A7 EB-FF FF F5 BE FF F9 FF FF   ....s...........
0007C0  3B 7F 7F FE DF FF ED DD-9B 7F FF DD FB DD DB F3   ;...............
0007D0  BF FF 6F FF 7F FF F7 FE-F6 CF FB FD FF 7D DE BB   ..o..........}..
0007E0  BF FB F7 FF BF DE FF 7F-EF FF DF 7E FA BB B7 FF   ...........~....
0007F0  F6 6D ED 7D FF EF DE DF-FE FD FF FD 7F 7B FF      .m.}.........{.
000800  FF FE F6 FE CF F9 FF FB-F3 FB FB BF F7 F7 F7 7F   ................
000810  CD BF FE 8F DB 9D DD 3E-BB 7B FF FB 7F FF FF FF   .......>.{......
000820  EF EE FF FD FF FF 5D FF-FB FF FF FF EF FF FE      ......].........
000830  FE FF F8 FF FF DF FF FF-FF FF FF FF F7 FD FF      ................
000840  FF FB FF FB B6 F7 FF F7-BB A7 B7 AF 4F 67 6F 9F   ............Ogo.
000850  DE CE FE FE 9D BF DF 5F-6F 2F FF EE FE FE FE CF   ......._o/......
000860  FF FD FF FF F9 FB FF F7-F2 F7 77 6E 67 6F DF DE   ..........wngo..
000870  DE BE 9D BD BD FD EB FD-3D ED FB EB EB F7 F7 F7   ........=.......
000880  F4 5D CF EF EB DD DE DB-BB BF BF BF ED CE FF CF   .]..............
000890  BE FF FF 17 F9 BF AF FF-E7 FF 7D FE F9 FF FF FE   ..........}.....
0008A0  FB FD DF 3F BB C7 97 4F-AF AF DF DE 5F 4F FF FD   ...?...O...._O..
0008B0  FF DE FE FF FF BF FF 7F-7F FF FF FF 00 00 00 00   ................
0008C0  00 00 00 00 00 00 00 00-00 00 00 00 00 00 00 00   ................
0008D0  00 00 00 00 00 00 00 00-00 00 00 00 00 00 00 00   ................
0008E0  00 00 00 00 00 00 00 00-00 00 00 00 00 00 00 00   ................
0008F0  00 00 00 00 00 00 00 00-00 00 00 00 00 00 00 00   ................
000900  00 00 00 00 00 00 00 00-00 00 00 00 00 00 00 00   ................
000910  00 00 00 00 00 00 00 00-00 00 00 00 00 00 00 00   ................
000920  00 00 00 00 00 00 00 00-00 00 00 00 00 00 00 00   ................
000930  00 00 00 00 00 00 00 00-00 00 00 00 00 00 00 00   ................
000940  00 00 00 00 00 00 00 00-00 00 00 00 00 00 00 00   ................
000950  00 00 00 00 00 00 00 00-00 00 00 00 00 00 00 00   ................
000960  00 00 00 00 00 00 00 00-00 00 00 00 00 00 00 00   ................
000970  00 00 00 00 00 00 00 00-00 00 00 00 00 00 00 00   ................
000980  00 00 00 00 00 00 00 00-00 00 00 00 00 00 00 00   ................
000990  00 00 00 00 00 00 00 00-00 00 00 00 00 00 00 00   ................
0009A0  00 00 00 00 00 00 00 00-00 00 00 00 00 00 00 00   ................
0009B0  00 00 00 00 00 00 00 00-00 00 00 00 00 00 00 00   ................
0009C0  00 00 00 00 00 00 00 00-00 00 00 00 00 00 00 00   ................
0009D0  00 00 00 00 00 00 00 00-00 00 00 00 00 00 00 00   ................
0009E0  00 00 00 00 00 00 00 00-00 00 00 00 00 00 00 00   ................
0009F0  00 00 00 00 00 00 00 00-00 00 00 00 00 00 00 00   ................
000A00  01 00 00 0C 80 00 01 7A-FF 00 00 00 01 00 00 18   .......z........
000A10  02 00 00 1C 20 00 03 07-22 00 00 28 24 00 01 0C   ........"..($...
000A20  FF 00 00 00 00 00 01 00-00 00 00 00 44 69 67 69   ............Digi
000A30  56 69 64 65 6F AA 20 43-6F 6C 6F 72 00 00 00 00   Video. Color....
000A40  00 00 00 E8 02 02 00 00-00 00 00 04 4E 56 FF FC   ............NV..
000A50  48 E7 7E 60 70 00 10 10-E9 48 80 10 00 40 0F 00   H.~`p....H...@..
000A60  E9 48 48 40 24 40 42 32-81 70 00 02 80 00 41 EE   .HH@$@B2.p....A.
000A70  FF FD 42 B2 81 70 00 00-80 00 11 7C 00 90 00 01   ..B..p.....|....
```

```
)00A80  11 7C 00 01 00 02 20 32-81 70 00 04 80 00 3C 38   .|.... 2.p....<8
)00A90  0D 00 CC FC 00 05 8C FC-03 E8 42 32 81 70 00 03   ..........B2.p..
)00AA0  00 00 41 EE FF FE 76 01-43 F2 81 70 00 02 80 00   ..A...v.C..p....
000AB0  1A 3C 00 03 61 68 1A 3C-00 02 61 62 42 05 61 5E   .<..ah.<..abB.a^
000AC0  12 18 74 07 E3 09 E3 10-02 00 00 01 1A 00 61 4E   ..t...........aN
000AD0  00 00 00 02 1A 00 61 46-1A 00 61 42 02 00 00 01   ......aF..aB....
000AE0  1A 00 61 3A 51 CA FF DE-42 05 61 32 1A 3C 00 02   ..a:Q...B.a2.<..
000AF0  61 2C 1A 3C 00 02 61 26-42 05 61 22 51 CB FF C2   a,.<..a&B.a"Q...
000B00  42 05 61 1A 1A 3C 00 02-61 14 1A 3C 00 03 61 0E   B.a..<..a..<..a.
000B10  1A 3C 00 03 61 08 4C DF-06 7E 4E 5E 4E 75 12 85   .<..a.L..~N^Nu..
000B20  3A 06 51 CD FF FE 4E 75-01 00 00 18 02 00 00 28   :.Q...Nu.......(
000B30  03 00 00 26 04 00 00 2E-05 00 00 32 FF 00 00 00   ...&.......2....
000B40  41 61 70 70 73 20 43 6F-72 70 6F 72 61 74 69 6F   Aapps Corporatio
000B50  6E 00 00 00 20 00 46 69-6E 61 6C 20 32 2E 30 00   n... .Final 2.0.
000B60  00 00 44 56 43 2D 30 30-31 00 32 33 2D 4D 61 79   ..DVC-001.23-May
000B70  2D 39 30 20 30 30 3A 33-36 3A 35 34 00 00 01 00   -90 00:36:54....
000B80  00 14 02 00 00 18 04 00-3C 08 00 00 01 FF 00      ........<......
000B90  00 00 00 03 00 05 00 02-00 01 44 69 73 70 6C 61   ..........Displa
000BA0  79 5F 54 56 5F 4D 69 63-72 6F 54 56 45 78 70 61   y_TV_MicroTVExpa
000BB0  6E 64 65 64 5F 4D 61 78-69 4D 6F 75 73 65 00 00   nded_MaxiMouse..
000BC0  00 00 02 00 00 08 FF 00-00 00 00 00 12 78 4C 00   .............xL.
000BD0  00 00 00 00 00 00 00 3A-00 00 07 82 10 C6 07 08   .......:........
000BE0  25 2E 44 69 73 70 6C 61-79 5F 54 56 5F 4D 69 63   %.Display_TV_Mic
000BF0  72 6F 54 56 45 78 70 61-6E 64 65 64 5F 4D 61 78   roTVExpanded_Max
000C00  69 4D 6F 75 73 65 00 00-60 12 00 00 00 00 D2 D7   iMouse..`.......
000C10  D7 A0 B2 B3 AD CD E1 F9-AD B9 B0 00 41 FA FF EC   ............A...
000C20  70 00 22 3C 00 01 8D FC-0E D0 00 40 67 00 01 DA   p."<.......@g...
000C30  70 00 10 29 00 28 E0 98-E8 88 23 40 00 2A 26 49   p..).(....#@.*&I
000C40  70 00 10 3C 00 B5 A7 1E-66 00 01 A2 27 48 00 14   p..<....f...'H..
000C50  24 48 25 6B 00 2A 00 08-30 38 0D 00 C0 FC 00 05   $H%k.*..08......
000C60  80 FC 03 E8 35 40 00 10-35 7C 00 20 00 2C 42 2A   ....5@..5|. .,B*
000C70  00 2E 28 6A 00 08 42 34-81 70 00 02 00 00 42 34   ..(j..B4.p....B4
000C80  81 70 00 02 80 00 41 F4-81 70 00 00 80 00 43 F4   .p....A..p....C.
000C90  81 70 00 04 80 00 70 0C-20 BC 00 01 DB 3F 20 11   .p....p. ....? .
000CA0  0C 00 00 3F 66 0A 25 7C-00 00 00 0F 00 30 60 08   ...?f.%|.....0`.
000CB0  25 7C 00 00 00 05 00 30-42 34 81 70 00 03 00 00   %|.....0B4.p....
000CC0  42 2A 00 2F 25 7C 00 00-40 00 00 34 25 7C 00 00   B*./%|..@..4%|..
000CD0  00 02 00 38 25 7C 00 00-00 02 00 3C 35 7C 00 80   ...8%|.....<5|..
000CE0  00 40 35 7C 00 00 48-50 EA 00 42 15 7C 00 00      .@5|...HP..B.|..
000CF0  00 18 15 7C 00 C0 00 19-15 7C 00 8E 00 1C 15 7C   ...|.....|.....|
000D00  00 60 00 1D 35 7C 06 B0-00 1A 15 7C 00 01 00 4A   .`..5|.....|...J
000D10  15 7C 00 90 00 4B 15 7C-00 19 00 4C 02 2A 00 0F   .|...K.|...L.*..
000D20  00 4C 15 7C 00 09 00 4D-15 7C 00 40 00 4E 42 2A   .L.|...M.|.@.NB*
000D30  00 4F 25 7C 20 20 00 20-00 50 25 7C 20 3F 3F 20   .O%|  . .P%| ??
000D40  00 54 25 7C 00 32 00 32-00 58 25 7C 00 00 00 32   .T%|.2.2.X%|...2
000D50  00 5C 25 7C 00 32 00 00-00 60 25 7C 00 64 00 32   .\%|.2...`%|.d.2
000D60  00 64 42 2A 00 68 50 EA-00 6C 4E BA 01 72 4A 40   .dB*.hP..lN..rJ@
000D70  66 7A 25 48 00 72 A0 29-50 EA 00 7A 25 72 81 61   fz%H.r.)P..z%r.a
000D80  00 72 00 76 25 6A 00 76-00 6E 4E BA 01 52 4A 40   .r.v%j.v.nN..RJ@
000D90  67 08 20 6A 00 72 A0 23-60 52 25 48 00 7C A0 29   g. j.r.#`R%H.|.)
000DA0  50 EA 00 7B 25 72 81 61-00 7C 00 80 42 2A 00 84   P..{%r.a.|..B*..
000DB0  70 10 A7 1E 66 36 31 7C-00 06 00 04 31 7C 00 C7   p...f61|....1|..
000DC0  00 06 49 FA 02 34 21 4C-00 08 21 4B 00 0C 70 00   ..I..4!L..!K..p.
000DD0  10 2B 00 28 A0 75 66 14-24 88 72 04 61 00 00 9A   .+.(.uf.$.r.a...
000DE0  66 0A 15 40 00 26 15 40-00 28 60 1E 70 E9 20 6A   f..@.&.@.(`.p. j
000DF0  00 72 A0 23 20 6A 00 7C-A0 23 20 52 A0 1F 20 4A   .r.# j.|.# R.. J
000E00  A0 1F 42 AB 00 14 60 02-70 E9 4E 75 20 38 01 6A   ..B...`.p.Nu 8.j
000E10  B0 AA 00 14 66 04 4A 80-4E 75 25 40 00 14 53 6A   ....f.J.Nu%@..Sj
000E20  00 12 4E 75 4A 2A 00 6B-67 34 35 7C 00 1E 00 12   ..NuJ*.kg45|....
000E30  25 78 01 6A 00 14 0C 2A-00 01 00 68 67 0E 4E BA   %x.j...*...hg.N.
```

```
000E40  FF CC 67 1E 4A 2A 00 6B-66 F4 60 16 42 2A 00 2C   ..g.J*.kf.'.B*.(
000E50  4E BA FF BA 67 0C 4A 2A-00 28 67 F4 60 04 4E BA   N...g.J*.(g.'.N.
000E60  02 76 4E 75 0C 2A 00 01-00 68 67 0A 4A 2A 00 6B   .vNu.*...hg.J*.k
000E70  66 04 4E BA 02 62 4E 75-48 E7 00 18 42 A7 AA 03   f.N..bNuH...B...
000E80  20 1F 67 42 25 40 00 0C-28 40 20 54 31 7C 00 08    .gB%@..(@ T1|..
000E90  00 20 42 68 00 1E 31 7C-00 01 00 22 31 7C 00 08   . Bh..1|..."1|..
000EA0  00 24 2F 28 00 2A AA 24-29 AA 00 80 81 51 4E BA   .$/(.*.$)....QN.
000EB0  00 72 4A 88 67 10 29 88-81 52 00 2A 42 00 61 00   .rJ.g.)..R.*B.a.
000EC0  0C 3A 70 00 60 12 70 FF-4A AA 00 0C 67 0A 2F 2A   .:p.'.p.J...g./*
000ED0  00 0C AA 04 42 AA 00 0C-4C DF 18 00 4E 75 20 2A   ....B...L...Nu *
000EE0  00 30 02 80 00 00 00 0A-67 26 20 3C 00 01 00 00   .0......g& <....
000EF0  A0 4C 67 24 20 3C 00 01-00 00 A0 4D 67 1A 20 3C   .Lg$ <.....Mg. <
000F00  00 01 00 00 A3 22 67 18-25 7C 00 00 00 05 00 30   ....."g.%|.....0
000F10  20 3C 00 00 40 00 60 06-20 3C 00 01 00 00 A3 22    <..@.'. <....."
000F20  4E 75 2F 0B 42 A7 3F 3C-00 80 AA 18 20 1F 67 08   Nu/.B.?<.... .g.
000F30  26 40 2F 00 A9 92 60 34-20 3C 00 00 04 08 A3 22   &@/...'4 <....."
000F40  66 2C 26 48 42 A7 AA 28-20 1F 20 53 20 C0 20 FC   f,&HB..( . S . .
000F50  00 00 00 7F 42 40 72 FF-30 C0 20 C1 30 C1 04 81   ...*B@r.0. .0...
000F60  02 02 02 02 52 40 0C 40-00 80 6D EC 20 4B 26 5F   ....R@.@..m. K&_
000F70  4E 75 FF FF DB DB B6 B6-92 92 6D 6D 49 49 24 24   Nu........mmII$$
000F80  00 00 FF FF AA AA 55 55-00 00 48 E7 38 1C 42 A7   ......UU..H.8.B.
000F90  3F 3C 00 81 AA 18 20 1F-67 08 26 40 2F 00 A9 92   ?<.... .g.&@/...
000FA0  60 4E 20 3C 00 00 08 08-A3 22 66 46 26 48 42 A7   'N <....."fF&HB.
000FB0  AA 28 20 1F 20 53 20 C0-20 FC 00 00 00 FF D0 FC   .( . S . .......
000FC0  08 00 49 FA FF AE 4B FA-FF BA 30 3C 00 FF 72 07   ..I...K...0<..r.
000FD0  74 07 76 03 31 35 32 00-31 34 22 00 31 34 12 00   t.v.152.14".14..
000FE0  31 00 53 40 51 CB FF EE-51 CA FF E8 51 C9 FF E2   1.S@Q...Q...Q...
000FF0  20 4B 4C DF 38 1C 4E 75-48 E7 7C BC 26 49 24 6B    KL.8.NuH.|.&I$k
001000  00 14 4A 32 81 63 00 08-00 06 80 00 42 2A 00 6B   ..J2.c......B*.k
001010  4A 2A 00 26 67 00 00 B8-70 00 10 32 81 63 00 08   J*.&g...p..2.c..
001020  00 07 00 00 08 00 00 00-67 06 50 EA 00 6A 60 04   ........g.P..j'.
001030  42 2A 00 6A 15 72 81 63-00 08 00 05 80 00 00 69   B*.j.r.c.......i
001040  4E BA 00 94 4A 2A 00 27-67 6C 41 F2 81 63 00 08   N...J*.'glA.c..
001050  00 04 00 00 20 2A 00 6E-67 5C 22 40 70 00 4A 2A   .... *.ng\"@p.J*
001060  00 6A 67 18 20 3C 00 00-00 80 08 2A 00 00 00 2F   .jg. <.....*.../
001070  67 06 06 80 00 00 00 80-D1 C0 44 80 D0 AA 00 34   g.........D....4
001080  4A 2A 00 6D 66 04 A0 2E-60 2C 24 18 E6 8A 48 42   J*.mf...',$...HB
001090  83 42 00 00 E1 41 48 42-83 42 00 00 48 41 24 18   .B...AHB.B..HA$.
0010A0  E6 8A 48 42 83 42 00 00-E1 41 48 42 83 42 00 00   ..HB.B...AHB.B..
0010B0  22 C1 59 80 66 D0 50 EA-00 28 4A 2A 00 2E 67 0E   ".Y.f.P..(J*..g.
0010C0  50 EA 00 6B 4A 32 81 63-00 08 00 06 00 00 70 01   P..kJ2.c......p.
0010D0  4C DF 3D 3E 4E 75 48 E7-10 08 28 6A 00 08 16 2A   L.=>NuH...(j...*
0010E0  00 42 08 03 00 00 67 00-00 8E 08 03 00 01 67 04   .B....g.......g.
0010F0  61 00 01 16 08 03 00 02-67 04 61 00 01 24 08 03   a.......g.a..$..
001100  00 03 67 04 61 00 01 32-08 03 00 04 67 0C 30 2A   ..g.a..2....g.0*
001110  00 48 19 80 81 70 00 01-00 00 12 03 02 41 00 E0   .H...p.......A..
001120  67 50 70 00 08 2A 00 00-00 2F 66 04 08 C0 00 00   gPp..*.../f.....
001130  08 2A 00 01 00 2F 66 0A-08 C0 00 01 02 41 00 60   .*.../f......A.'
001140  67 08 19 80 81 70 00 02-00 00 08 03 00 07 67 22   g....p........g"
001150  08 C0 00 02 19 80 81 70-00 02 00 00 15 74 81 70   .......p.....t.p
001160  00 05 80 00 00 69 08 80-00 02 19 80 81 70 00 02   .....i.......p..
001170  00 00 42 2A 00 42 16 2A-00 84 08 03 00 01 67 0A   ..B*.B.*......g.
001180  20 2A 00 90 15 74 08 00-00 85 08 2A 00 02 00 84    *...t......*....
001190  67 0A 20 2A 00 94 15 74-08 00 00 86 08 03 00 00   g. *...t........
0011A0  67 00 00 60 08 03 00 03-67 0A 20 2A 00 98 19 AA   g..'....g. *....
0011B0  00 8A 08 00 08 03 00 04-67 0A 20 2A 00 9C 19 AA   ........g. *....
0011C0  00 8C 08 00 08 03 00 05-67 1E 20 2A 00 08 D0 AA   ........g. *....
0011D0  00 A0 20 40 22 6A 00 A4-4A 2A 00 8B 66 04 20 49   .. @"j..J*..f. I
0011E0  22 40 20 2A 00 A8 A0 2E-08 03 00 06 67 10 20 6A   "@ *........g. j
0011F0  00 AC 20 2A 00 B0 12 2A-00 B4 4E BA 00 54 42 2A   .. *...*..N..TB*
```

```
001200  00 84 4C DF 10 08 4E 75-2F 08 41 EA 00 1A 70 00   ..L...Nu/.A...p.
001210  10 2A 00 18 12 2A 00 19-61 00 00 36 20 5F 4E 75   .*...*..a..6 _Nu
001220  2F 08 41 EA 00 4C 70 00-10 2A 00 4A 12 2A 00 4B   /.A..Lp..*.J.*.K
001230  61 00 00 1E 20 5F 4E 75-2F 08 41 EA 00 4F 70 00   a... _Nu/.A..Op.
001240  10 2A 00 4D 12 2A 00 4E-61 00 00 06 20 5F 4E 75   .*.M.*.Na... _Nu
001250  48 E7 F8 40 43 F2 81 63-00 08 00 02 80 00 18 3C   H..@C..c.......<
001260  00 03 61 66 18 3C 00 02-61 60 42 04 61 5C 74 07   ..af.<..a`B.a\t.
001270  E3 09 E3 13 02 03 00 01-18 03 61 4E 00 03 00 02   ..........aN....
001280  18 03 61 46 18 03 61 42-02 03 00 01 18 03 61 3A   ..aF..aB......a:
001290  51 CA FF DE 42 04 61 32-18 3C 00 02 61 2C 18 3C   Q...B.a2.<..a,.<
0012A0  00 02 61 26 42 04 61 22-12 18 51 C8 FF C2 42 04   ..a&B.a"..Q...B.
0012B0  61 18 18 3C 00 02 61 12-18 3C 00 03 61 0C 18 3C   a..<..a..<..a..<
0012C0  00 03 61 06 4C DF 02 1F-4E 75 12 84 38 2A 00 10   ..a.L...Nu..8*..
0012D0  51 CC FF FE 4E 75 2F 09-26 49 24 6B 00 14 02 2A   Q...Nu/.&I$k...*
0012E0  00 0F 00 4C 00 2A 00 05-00 42 22 4A 42 2A 00 2E   ...L.*...B"JB*..
0012F0  4E BA FB 32 42 40 10 2B-00 28 22 12 67 08 20 41   N..2B@.+.(".g. A
001300  A0 76 20 52 A0 1F 20 2A-00 0C 67 0E 20 40 A0 25   .v R.. *..g. @.%
001310  4A 80 6B 06 2F 2A 00 0C-AA 04 20 2A 00 72 67 0E   J.k./*.... *.rg.
001320  20 40 A0 25 4A 80 6B 06-20 6A 00 72 A0 23 20 2A    @.%J.k. j.r.# *
001330  00 7C 67 0E 20 40 A0 25-4A 80 6B 06 20 6A 00 7C   .|g. @.%J.k. j.|
001340  A0 23 20 0A 67 04 20 40-A0 1F 70 00 22 5F 4E 75   .# .g. @..p."_Nu
001350  48 E7 1C C8 28 49 30 28-00 1A 47 E8 00 1C 0C 40   H...(I0(..G....@
001360  00 20 62 00 02 4C 24 69-00 14 E3 48 30 3B 00 06   . b..L$i...H0;..
001370  4E FB 00 02 01 98 02 00-02 06 02 1A 00 EC 02 22   N.............."
001380  02 4A 02 82 02 B0 02 6A-03 40 03 76 03 92 03 C0   .J.....j.@.v....
001390  03 F8 04 08 04 18 04 28-04 38 04 48 04 58 04 70   .......(.8.H.X.p
0013A0  04 A8 04 DE 05 72 05 8E-05 98 05 A0 05 BA 05 D4   .....r..........
0013B0  05 E4 05 F4 06 0C 00 03-00 02 00 04 06 50 00 60   .............P.`
0013C0  00 02 00 05 00 06 07 B0-00 60 00 02 00 07 00 0D   .........`......
0013D0  0D D0 00 60 00 01 00 0E-00 53 20 50 00 60 00 04   ...`.....S P.`..
0013E0  43 6F 70 79 72 69 67 68-74 20 A9 20 31 39 38 39   Copyright . 1989
0013F0  2C 20 31 39 39 30 20 62-79 20 41 61 70 70 73 20   , 1990 by Aapps
001400  43 6F 72 70 6F 72 61 74-69 6F 6E 2E 20 20 41 6C   Corporation.  Al
001410  6C 20 52 69 67 68 74 73-20 52 65 73 65 72 76 65   l Rights Reserve
001420  64 2E 00 05 00 02 00 04-06 50 00 60 00 02 00 05   d........P.`....
001430  00 06 07 B0 00 60 00 02-00 07 00 0D 0D D0 00 60   .....`..........`
001440  00 01 00 0E 00 16 0A 70-00 60 00 02 00 17 00 5E   .......p.`.....^
001450  10 70 00 60 00 01 00 5F-00 63 08 90 00 60 00 02   .p.`..._.c...`..
001460  36 1B 30 2A 00 40 4A 2A-00 29 67 02 52 40 59 4F   6.0*.@J*.)g.R@YO
001470  2F 3C 4D 54 56 44 3F 00-A9 A0 22 5F 4A 89 66 10   /<MTVD?..."_J.f.
001480  43 FA FF 34 4A 2A 00 29-67 08 43 FA FF 96 60 02   C..4J*.)g.C...`.
001490  22 51 34 19 30 11 B6 40-65 06 B6 69 00 02 63 0C   "Q4.0..@e..i..c.
0014A0  D2 FC 00 0A 51 CA FF EE-60 00 01 06 35 43 00 20   ....Q...`...5C.
0014B0  96 40 30 29 00 06 C6 C0-D6 69 00 04 D6 5B 0C 43   .@0).....i...[.C
0014C0  00 0E 6E 02 76 0F 35 43-00 1A 48 43 42 43 48 43   ..n.v.5C..HCBCHC
0014D0  70 0C E1 AB 04 83 00 2D-C0 00 25 43 00 22 30 29   p......-..%C."0)
0014E0  00 08 0C 40 00 01 66 06-30 3C 00 50 60 10 0C 40   ...@..f.0<.P`..@
0014F0  00 02 66 06 30 3C 00 60-60 04 30 3C 00 30 15 40   ..f.0<.``.0<.0.@
001500  00 1D 08 EA 00 01 00 42-60 00 02 16 4A 13 66 38   .......B`...J.f8
001510  4A 2A 00 26 67 00 00 5E-4A 2A 00 7A 66 06 20 6A   J*.&g..^J*.zf. j
001520  00 72 A0 2A 4A 2A 00 7B-66 06 20 6A 00 7C A0 2A   .r.*J*.{f. j.|.*
001530  20 2A 00 38 72 00 4E BA-06 F8 08 EA 00 00 00 42    *.8r.N........B
001540  4E BA F8 E2 42 2A 00 26-4A 13 67 10 20 6A 00 72   N...B*.&J.g. j.r
001550  A0 29 20 6A 00 7C A0 29-4E BA 04 4C 20 2A 00 38   .) j.|.)N..L *.8
001560  22 2A 00 3C 4E BA 06 CA-08 EA 00 00 00 42 4A 13   "*.<N........BJ.
001570  56 EA 00 26 4A 13 56 EA-00 27 4E BA F8 E8 50 EA   V.&J.V..'N...P.
001580  00 6B 4A 32 81 63 00 08-00 06 00 00 60 26 4A 13   .kJ2.c......`&J.
001590  56 EA 00 29 60 1E 20 1B-32 1B 25 40 00 22 4E BA   V..)`. .2.%@."N.
0015A0  06 0C 4A 40 66 0A 08 EA-00 01 00 42 60 00 01 72   ..J@f......B`..r
0015B0  70 EF 60 02 70 00 4C DF-13 38 60 00 08 76 30 13   p.`.p.L..8`..v0.
```

```
0015C0  72 10 E3 A8 42 40 59 4F-48 79 00 0E 49 24 2F 00   r...B@YOHy..I$/.
0015D0  A8 68 20 1F 72 10 E2 A8-36 80 60 00 01 58 22 6A   .h .r...6.`..X"j
0015E0  00 0C 20 31 81 51 67 C8-10 2B 00 0E 4E BA 04 2A   .. 1.Qg..+..N..*
0015F0  4E BA 04 6A 60 BE 12 2B-00 02 10 13 66 10 26 BC   N..j`..+....f.&.
001600  00 00 00 02 27 7C 00 00-00 02 00 04 60 0E 26 BC   ....'|......`.&.
001610  00 00 00 01 27 7C 00 00-00 01 00 04 17 41 00 08   ....'|.......A..
001620  60 00 00 C8 30 13 72 01-E1 A9 C2 AA 00 30 67 80   `...0.r......0g.
001630  1F 2A 00 2F 15 40 00 2F-61 00 04 C0 4A 00 66 08   .*./.@./a...J.f.
001640  15 5F 00 2F 60 00 FF 6A-08 EA 00 05 00 42 30 13   ._./`..j.....B0.
001650  08 80 00 00 12 17 B3 00-66 08 10 1F 54 4B 60 00   ........f...TK`.
001660  00 C0 08 EA 00 06 00 42-08 2A 00 01 00 2F 67 06   .......B.*.../g.
001670  4E BA F9 18 60 04 4E BA-F8 AA 4A 88 66 1C 15 5F   N...`.N...J.f.._
001680  00 2F 30 13 08 80 00 01-12 2A 00 2F B3 00 67 00   ./0......*./..g.
001690  FF 20 61 00 04 66 60 00-FF 18 54 4F 2F 08 22 72   . a..f`...TO/."r
0016A0  81 61 00 0C 20 69 00 2A-A0 23 23 5F 00 2A 54 4B   .a.. i.*.##_.*TK
0016B0  60 00 00 6E 30 13 0C 40-00 08 57 C1 67 12 0C 2A   `..n0..@..W.g..*
0016C0  00 01 00 2F 6E 00 FE EA-0C 40 00 04 66 00 FE E2   .../n....@..f...
0016D0  15 41 00 6D 20 72 81 61-00 0C 31 40 00 20 31 40   .A.m r.a..1@. 1@
0016E0  00 24 61 00 04 76 60 00-00 38 20 13 22 2B 00 04   .$a..v`..8 ."+..
0016F0  4E BA 05 3E 4A 40 66 00-FE B8 25 5B 00 38 25 5B   N..>J@f...%[.8%[
001700  00 3C 60 00 00 1C 30 1B-0C 40 00 07 62 00 FE A2   .<`...0..@..b...
001710  4A 40 6B 00 FE 9C 35 40-00 48 08 EA 00 04 00 42   J@k...5@.H.....B
001720  4A 13 67 00 FE 90 08 EA-00 00 00 42 4E BA F7 36   J.g........BN..6
001730  60 00 FE 82 30 3C 00 64-90 53 4E BA 03 90 15 40   `...0<.d.SN....@
001740  00 55 4A 6A 00 62 66 12-4A 53 67 0E 20 2A 00 38   .UJj.bf.JSg. *.8
001750  22 2A 00 3C 35 5B 00 62-60 0C 35 5B 00 62 66 0A   "*.<5[.b`.5[.bf.
001760  20 2A 00 38 72 00 61 00-04 C8 60 6E 30 13 4E BA    *.8r.a...`n0.N.
001770  03 5C 15 40 00 50 35 5B-00 58 60 5E 30 13 4E BA   .\.@.P5[.X`^0.N.
001780  03 4C 15 40 00 51 35 5B-00 5A 60 4E 30 13 4E BA   .L.@.Q5[.Z`N0.N.
001790  03 3C 15 40 00 52 35 5B-00 5C 60 3E 30 13 4E BA   .<.@.R5[.\`>0.N.
0017A0  03 2C 15 40 00 53 35 5B-00 5E 60 2E 30 13 4E BA   .,.@.S5[.^`.0.N.
0017B0  03 1C 15 40 00 54 35 5B-00 60 60 1E 30 13 4E BA   ...@.T5[.``.0.N.
0017C0  03 0C 15 40 00 56 35 5B-00 64 60 0E 30 13 4E BA   ...@.V5[.d`.0.N.
0017D0  02 FC 15 40 00 57 35 5B-00 66 08 EA 00 03 00 42   ...@.W5[.f.....B
0017E0  60 00 FF 3E 30 13 0C 40-00 01 6E 00 FD C4 4A 53   `..>0..@..n...JS
0017F0  6B 00 FD BE 0C 40 00 00-67 14 50 EA 00 2E 50 EA   k....@..g.P...P.
001800  00 6B 4A 32 81 63 00 08-00 06 00 00 60 04 42 2A   .kJ2.c......`.B*
001810  00 2E 15 40 00 68 42 00-60 00 FD 9A 15 53 00 7A   ...@.hB.`....S.z
001820  15 6B 00 02 00 7B 4A 2A-00 26 66 00 FD 88 20 6A   .k...{J*.&f... j
001830  00 72 4A 2A 00 7A 67 04-A0 29 60 02 A0 2A 20 6A   .rJ*.zg..)`..* j
001840  00 7C 4A 2A 00 7B 67 04-A0 29 60 02 A0 2A 60 00   .|J*.{g..)`..*`.
001850  FD 64 20 13 67 1C 20 40-A0 25 4A 80 6B 00 FD 52   .d .g. @.%J.k..R
001860  B0 AA 00 34 6C 0C 20 2A-00 34 20 53 A0 24 66 00   ...4l. *.4 S.$f.
001870  FD 40 20 2B 00 04 67 1E-20 40 A0 25 4A 80 6B 00   .@ +..g. @.%J.k.
001880  FD 30 B0 AA 00 34 6C 0E-20 2A 00 34 20 6B 00 04   .0...4l. *.4 k..
001890  A0 24 66 00 FD 1C 10 2A-00 26 80 2A 00 7A 67 08   .$f....*.&.*.zg.
0018A0  20 13 67 04 20 40 A0 29-10 2A 00 26 80 2A 00 7B    .g. @.).*.&.*.{
0018B0  67 0A 20 2B 00 04 67 04-20 40 A0 29 25 53 00 72   g. +..g. @.)%S.r
0018C0  25 6B 00 04 00 7C 4E BA-00 DE 10 2B 00 08 C0 2A   %k...|N....+...*
0018D0  00 26 C0 2A 00 27 C0 2A-00 28 67 00 FC D8 4E BA   .&.*.'.*.(g...N.
0018E0  F5 44 60 00 FC D0 35 53-00 40 4A 2B 00 02 67 00   .D`...5S.@J+..g.
0018F0  FC C4 36 AA 00 20 42 6B-00 02 50 EB 00 04 60 00   ..6.. Bk..P...`.
001900  FB 60 10 13 4E BA 01 12-60 00 FC AA 4E BA 01 4E   .`..N...`...N..N
001910  60 00 FC A2 25 6B 00 04-00 90 08 EA 00 01 00 84   `...%k..........
001920  4E BA F5 02 17 AA 00 85-81 51 60 00 FC 88 25 6B   N........Q`...%k
001930  00 04 00 94 08 EA 00 02-00 84 4E BA F4 E8 27 AA   ..........N...'.
001940  00 86 81 51 60 00 FC 6E-25 5B 00 98 15 5B 00 8A   ...Q`..n%[...[..
001950  08 EA 00 03 00 84 60 3A-25 5B 00 9C 25 5B 00 8C   ......`:%[..%[..
001960  08 EA 00 04 00 84 60 2A-25 5B 00 A4 25 5B 00 A0   ......`*%[..%[..
001970  25 5B 00 A8 15 5B 00 8B-08 EA 00 05 00 84 60 12   %[...[........`.
```

```
001980  25 5B 00 AC 25 5B 00 B0-15 5B 00 B4 08 EA 00 0t   %[..%[...[......
001990  00 84 4A 13 67 00 FC 1E-08 EA 00 00 00 84 4E BA   ..J.g.........N.
0019A0  F4 C4 60 00 FC 10 70 00-20 6A 00 72 22 6A 00 7C   ..`...p. j.r"j.|
0019B0  4A 88 67 08 25 50 00 76-70 01 60 04 42 AA 00 76   J.g.%P.vp.`.B..v
0019C0  25 49 00 7C 67 08 25 51-00 80 52 40 60 04 42 AA   %I.|g.%Q..R@`.B.
0Q19D0  00 80 4A 40 66 0E 42 AA-00 6E 20 72 81 61 00 0C   ..J@f.B..n r.a..
0019E0  42 90 4E 75 0C 40 00 02-66 12 25 6A 00 76 00 6E   B.Nu.@..f.%j.v.n
0019F0  20 72 81 61 00 0C 20 AA-00 80 4E 75 42 2A 00 68    r.a.. ...NuB*.h
001A00  20 2A 00 76 66 04 20 2A-00 80 25 40 00 6E 22 72    *.vf. *..%@.n"r
001A10  81 61 00 0C 22 80 4E 75-22 2A 00 6E 67 3C 20 41   .a..".Nu"*.ng< A
001A20  22 72 81 61 00 0C 4A 2A-00 68 67 12 4A 2A 00 6C   "r.a..J*.hg.J*.l
001A30  67 06 25 51 00 6E 22 88-15 40 00 6C 60 1C 1F 00   g.%Q.n"..@.l`...
001A40  22 51 20 2A 00 34 A0 2E-10 1F 67 0E 50 EA 00 6B   "Q *.4....g.P..k
001A50  4A 32 81 63 00 08 00 06-00 00 4E 75 59 4F 48 57   J2.c......NuYOHW
001A60  A8 74 2F 13 A8 73 22 6A-00 0C 4A B1 81 51 67 58   .t/..s"j..J..QgX
001A70  2F 31 81 52 00 2A 2F 11-10 33 81 52 00 06 08 00   /1.R.*/..3.R....
001A80  00 07 67 24 20 73 81 52-00 02 0C 70 00 08 81 52   ..g$ s.R...p...R
001A90  00 20 5F C3 C6 2B 00 0F-67 0A 23 B0 81 52 00 2A   . _..+..g.#..R.*
001AA0  81 52 00 2A 2F 10 60 06-48 73 81 52 00 02 2F 2B   .R.*/.`.Hs.R../+
001AB0  00 04 2F 2B 00 08 3F 2B-00 0C 42 A7 A8 EC 22 6A   ../+.?+..B..."j
001AC0  00 0C 23 9F 81 52 00 2A-A8 73 4E 75 0C 40 00 64   ..#..R.*.sNu.@.d
001AD0  6F 04 30 3C 00 64 4A 40-6C 02 70 00 72 10 E3 A8   o.0<.dJ@l.p.r...
001AE0  42 40 5D 4F 2F 00 2F 3C-00 00 A1 47 A8 68 A8 6C   B@]O/./<...G.h.l
001AF0  30 1F 08 EA 00 03 00 42-4E 75 2F 03 26 3C 00 00   0......BNu/.&<..
001B00  40 00 08 2A 00 00 00 2F-67 06 26 3C 00 01 00 00   @..*.../g.&<....
001B10  20 6A 00 72 4A 88 67 06-A0 25 B0 83 6D 36 20 6A    j.rJ.g..%..m6 j
001B20  00 7C 4A 88 67 06 A0 25-B0 83 6D 28 20 72 81 61   .|J.g..%..m( r.a
001B30  00 0C 61 00 00 26 30 3C-00 80 08 2A 00 00 00 2F   ..a..&0<...*.../
001B40  67 04 30 3C 01 00 41 E8-00 06 42 98 30 C0 30 80   g.0<..A...B.0.0.
001B50  70 01 60 02 70 00 26 1F-4E 75 20 3C 00 00 40 00   p.`.p.&.Nu <..@.
001B60  32 3C 00 80 08 2A 00 00-00 2F 67 08 20 3C 00 01   2<...*.../g. <..
001B70  00 00 E3 49 4A 2A 00 6D-67 04 E2 88 E2 49 25 40   ...IJ*.mg....I%@
001B80  00 34 00 41 80 00 31 41-00 04 4E 75 00 02 00 37   .4.A..1A..Nu...7
001B90  40 00 00 9D 40 00 00 02-00 A2 00 00 01 C3 40 00   @...@.........@.
001BA0  00 01 01 C8 00 00 03 21-40 00 00 04 48 E7 30 00   .......!@...H.0.
001BB0  26 00 4A 41 66 36 59 4F-2F 3C 4D 54 56 46 3F 3C   &.JAf6YO/<MTVF?<
001BC0  00 80 A9 A0 22 5F 4A 89-66 06 43 FA FF C0 60 02   ...."_J.f.C...`.
001BD0  22 51 34 19 B6 91 65 06-B6 A9 00 04 63 0A D2 FC   "Q4...e.....c...
001BE0  00 0A 51 CA FF F0 60 3E-32 29 00 08 0C 41 00 01   ..Q...`>2)...A..
001BF0  66 06 32 3C 00 50 60 10-0C 41 00 02 66 06 32 3C   f.2<.P`..A..f.2<
001C00  00 60 60 04 32 3C 00 30-15 41 00 1D 06 83 00 2D   .``.2<.0.A.....-
001C10  C0 00 74 0C E4 AB 0C 43-00 0E 6E 02 76 0F 35 43   ..t....C..n.v.5C
001C20  00 1A 70 00 60 04 30 3C-FF EF 4C DF 00 0C 4E 75   ..p.`.0<..L...Nu
001C30  48 E7 30 00 74 01 4A 80-67 16 0C 40 00 01 66 06   H.0.t.J.g..@..f.
001C40  00 02 00 05 60 0A 0C 40-00 02 66 3E 00 02 00 09   ....`..@..f>....
001C50  4A 6A 00 62 67 26 4A 81-67 22 0C 41 00 01 66 06   Jj.bg&J.g".A..f.
001C60  00 02 00 60 60 16 0C 41-00 02 66 06 00 02 00 10   ...``..A..f.....
001C70  60 0A 0C 41 00 04 66 12-00 02 00 A0 15 42 00 4C   `..A..f......B.L
001C80  08 EA 00 02 00 42 70 00-60 04 30 3C FF EF 4C DF   .....Bp.`.0<..L.
001C90  00 0C 4E 75 48 E7 00 F0-30 28 00 1A 47 E8 00 1C   ..NuH...0(..G...
001CA0  0C 40 00 07 62 1E 24 69-00 14 E3 48 30 3B 00 06   .@..b.$i...H0;..
001CB0  4E FB 00 02 00 1E 00 00-00 30 00 7E 00 86 01 10   N........0.~....
001CC0  01 1C 01 54 70 EE 60 02-70 00 4C DF 0F 00 60 00   ...Tp.`.p.L...`.
001CD0  01 62 70 FF 72 00 0A EA-00 40 00 28 16 80 60 E8   .bp.r....@.(..`.
001CE0  42 13 60 E4 16 EA 00 26-0C AA 00 00 00 01 00 38   B.`....&.......8
001CF0  57 DB 16 EA 00 29 72 01-20 2A 00 30 03 00 56 DB   W....)r. *.0...V.
001D00  12 2A 00 2F 36 C1 26 EA-00 0C 4A 2A 00 6D 56 DB   .*./6.&...J*.mV.
001D10  42 1B 42 5B 72 3F 92 2A-00 55 83 FC 00 09 36 C1   B.B[r?.*.U....6.
001D20  36 EA 00 1E 36 EA 00 20-26 EA 00 22 26 AA 00 6E   6...6.. &.."&..n
001D30  60 96 26 BC 00 00 0F FF-60 8E 20 53 30 FC 00 20   `.&.....`. S0..
```

```
001D40  20 EA 00 30 10 EA 00 26-52 48 20 EA 00 38 20 EA   ..0...&RH ..8 .
001D50  00 3C 10 2A 00 2F 30 C0-30 EA 00 58 30 EA 00 5A   .<.*./0.0..X0..Z
001D60  30 EA 00 5C 30 EA 00 5E-30 EA 00 64 20 FC 00 32   0..\0..^0..d ..2
001D70  00 32 20 FC 00 32 00 32-42 58 30 EA 00 62 42 58   .2 ..2.2BX0..bBX
001D80  30 EA 00 20 10 EA 00 29-52 48 20 EA 00 22 30 EA   0.. ...)RH .."0.
001D90  00 1E 30 EA 00 66 30 FC-00 32 30 EA 00 48 08 2A   ..0..f0..20..H.*
001DA0  00 02 00 69 67 06 30 FC-FF FF 60 04 30 FC 00 02   ...ig.0...`.0...
001DB0  30 EA 00 60 30 FC 00 32-20 EA 00 72 20 EA 00 7C   0..`0..2 ..r ..|
001DC0  60 00 FF 06 08 2A 00 01-00 69 57 D3 60 00 FE FA   `....*...iW.`...
001DD0  0C 2A 00 01 00 68 67 0C-26 EA 00 72 26 AA 00 7C   .*...hg.&..r&..|
001DE0  60 00 FE E6 20 72 81 61-00 72 B1 EA 00 6E 66 0C   `... r.a.r...nf.
001DF0  26 EA 00 72 26 AA 00 7C-60 00 FE CE 26 EA 00 7C   &..r&..|`...&..|
001E00  26 AA 00 72 60 00 FE C2-1F 2A 00 42 15 7C 00 81   &..r`....*.B.|..
001E10  00 42 4E BA F0 10 15 5F-00 42 08 2A 00 00 00 69   .BN...._.B.*...i
001E20  67 08 36 BC FF FF 60 00-FE A0 36 BC 00 02 60 00   g.6...`...6...`.
001E30  FE 98 08 28 00 09 00 06-67 02 4E 75 4E F0 81 E1   ...(....g.NuN...
001E40  08 FC 00 00 00 00 00 00-00 00 00 00 00 00 00 00   ................
001E50  00 00 00 00 00 00 00 00-00 00 00 00 00 00 00 00   ................
001E60  00 00 00 00 00 00 00 00-00 00 00 00 00 00 00 00   ................
001E70  00 00 00 00 00 00 00 00-00 00 00 00 00 00 00 00   ................
001E80  00 00 00 00 00 00 00 00-00 00 00 00 00 00 00 00   ................
001E90  00 00 00 00 00 00 00 00-00 00 00 00 00 00 00 00   ................
001EA0  00 00 00 00 00 00 00 00-00 00 00 00 00 00 00 00   ................
001EB0  00 00 00 00 00 00 00 00-00 00 00 00 00 00 00 00   ................
001EC0  00 00 00 00 00 00 00 00-00 00 00 00 00 00 00 00   ................
001ED0  00 00 00 00 00 00 00 00-00 00 00 00 00 00 00 00   ................
001EE0  00 00 00 00 00 00 00 00-00 00 00 00 00 00 00 00   ................
001EF0  00 00 00 00 00 00 00 00-00 00 00 00 00 00 00 00   ................
001F00  00 00 00 00 00 00 00 00-00 00 00 00 00 00 00 00   ................
001F10  00 00 00 00 00 00 00 00-00 00 00 00 00 00 00 00   ................
001F20  00 00 00 00 00 00 00 00-00 00 00 00 00 00 00 00   ................
001F30  00 00 00 00 00 00 00 00-00 00 00 00 00 00 00 00   ................
001F40  00 00 00 00 00 00 00 00-00 00 00 00 00 00 00 00   ................
001F50  00 00 00 00 00 00 00 00-00 00 00 00 00 00 00 00   ................
001F60  00 00 00 00 00 00 00 00-00 00 00 00 00 00 00 00   ................
001F70  00 00 00 00 00 00 00 00-00 00 00 00 00 00 00 00   ................
001F80  80 40 20 10 08 04 02 01-00 01 02 04 08 10 20 40   .@ ........... @
001F90  80 40 20 10 08 04 02 01-00 01 02 04 08 10 20 40   .@ ........... @
001FA0  80 40 20 10 08 04 02 01-00 01 02 04 08 10 20 40   .@ ........... @
001FB0  80 40 20 10 08 04 02 01-00 01 02 04 08 10 20 40   .@ ........... @
001FC0  70 75 67 69 20 6B 6F 68-6C 20 77 61 6E 74 65 64   pugi kohl wanted
001FD0  20 74 6F 20 62 65 20 69-6D 6D 6F 72 74 61 6C 69    to be immortali
001FE0  7A 65 64 20 68 65 72 65-00 00 00 00 00 FF EA 14   zed here........
001FF0  00 00 16 00 3A B6 E3 22-01 01 5A 93 2B C7 00      ....:.."..Z.+..
```

I claim:

1. A video data transfer apparatus for assembling and rapidly transferring digital data words defining pixels of a video image to an internal bus of a cooperating personal computer which includes a display screen upon which the personal computer may display the video image received from said video data transfer apparatus; the video data transfer apparatus receiving digital data words of the video image from a video signal conversion subsystem which converts an analog television signal into the digital data words; said video data transfer apparatus comprising:

a video memory which receives the digital data words of the video image from the video signal conversion subsystem and which stores the received digital data words;

a video data transfer controller which transmits a signal that informs the personal computer when digital data words of the video image are present in said video memory, and which subsequently receives from the personal computer a command to transfer, to the internal bus of the personal computer, digital data words of the video image; and word buffers that operate in response to load signals received from the video data transfer controller for respectively receiving from said video memory and temporarily storing digital data words of the video image, and then the word buffers, in response to a transfer signal received from the video data transfer controller, transfer, to the internal bus of the personal computer, the digital data words of the video image, which is present in the word buffers, whereby the personal computer may display the video image of the analog television signal on the display screen in real-time.

2. The video data transfer apparatus of claim 1 wherein said word buffers in said video data transfer apparatus comprise four eight-bit buffers adapted to transfer thirty-two data bits for use in the cooperating personal computer which uses data words of thirty-two bits.

3. The video data transfer apparatus of claim 2 wherein all but one of said word buffers are latched uni-directional buffers, and the remaining one of said word buffers is a bi-directional buffer adapted to receive control signals from the cooperating personal computer.

4. The video data transfer apparatus of claim 1 wherein said video data transfer controller includes:

a programmable gate array logic integrated circuit for transmitting the signal that informs the personal computer when digital data words are present in said video memory, for receiving the command from the personal computer to transfer to the internal bus of the personal computer digital data words of the video image, and for producing both the load signals and the transfer signal to which said word buffers respond; and a read only memory for storing software instructions loaded into said programmable gate array logic integrated circuit.

5. The video data transfer apparatus of claim 4 wherein said read only memory also stores a driver program that is loaded into and executed by the cooperating personal computer to effect picture control and decoding operations of the personal computer.

6. The video data transfer apparatus of claim 1 wherein said video data transfer controller includes a read only memory for storing a driver program that is loaded into and executed by the cooperating personal computer to effect picture control and decoding operations of the personal computer.

7. The video data transfer apparatus of claim 1 wherein all but one of said word buffers are latched uni-directional buffers, and the remaining one of said word buffers is a bi-directional buffer adapted to receive control signals from the cooperating personal computer.

8. The video data transfer apparatus of claim 1 wherein each digital data word defines a pixel of a black and white video image.

9. The video data transfer apparatus of claim 1 wherein each digital data word defines a pixel of a color video image.

10. In an apparatus for displaying on a display screen of a personal computer a video image specified by digital data words defining pixels of the video image, the apparatus including a video data transfer apparatus which receives digital data words of the video image from a video signal conversion subsystem that converts an analog television signal into the digital data words, said video data transfer apparatus also assembling and rapidly transferring digital data words directly to an internal bus of the personal computer, the improvement comprising:

a video memory which receives the digital data words of the video image from the video signal conversion subsystem and which stores the received digital data words;

a video data transfer controller which transmits a signal that informs the personal computer when digital data words of the video image are present in said video memory, and which subsequently receives from the personal computer a command to transfer, to the internal bus of the personal computer, digital data words of the video image; and word buffers that operate in response to load signals received from the video data transfer controller for respectively receiving from said video memory and temporarily storing digital data words of the video image, and then the word buffers, in response to a transfer signal received from the video data transfer controller, transfer, to the internal bus of the personal computer, the digital data words of the video image, which is present in the word buffers, whereby the personal computer may display the video image of the analog television signal on the display screen in real-time.

11. The video data transfer apparatus of claim 10 wherein said video data transfer controller includes:

a programmable gate array logic integrated circuit for transmitting the signal that informs the personal computer when digital data words are present in said video memory, for receiving the command from the personal computer to transfer to the internal bus of the personal computer digital data words of the video image, and for producing both the load signals and the transfer signal to which said word buffers respond; and a read only memory for storing software instructions loaded into said programmable gate array logic integrated circuit.

12. The video data transfer apparatus of claim 11 wherein said read only memory also stores a driver program that is loaded into and executed by the cooperating personal computer to effect picture control and decoding operations of the personal computer.

13. The video data transfer apparatus of claim 10 wherein said video data transfer controller includes a read only memory for storing a driver program that is loaded into and executed by the cooperating personal computer to effect picture control and decoding operations of the personal computer.

14. The video data transfer apparatus of claim 10 wherein said word buffers in said video data transfer apparatus comprise four eight-bit buffers adapted to transfer thirty-two data bits for use in the cooperating personal computer which uses data words of thirty-two bits.

15. The video data transfer apparatus of claim 14 wherein all but one of said word buffers are latched uni-directional buffers, and the remaining one of said word buffers is a bi-directional buffer adapted to receive control signals from the cooperating personal computer.

16. The video data transfer apparatus of claim 10 wherein all but one of said word buffers are latched uni-directional buffers, and the remaining one of said word buffers is a bi-directional buffer adapted to receive control signals from the cooperating personal computer.

17. The video data transfer apparatus of claim 10 wherein each digital data word defines a pixel of a black and white video image.

18. The video data transfer apparatus of claim 10 wherein each digital data word defines a pixel of a color video image.

19. A method for receiving digital data words defining pixels of a video image from a video signal conversion subsystem which converts an analog television signal into the digital data words; and for assembling and rapidly transferring the digital data words directly to an internal bus of a cooperating personal computer which includes a display screen upon which the personal computer may display the received video image; said method comprising the steps of:

receiving digital data words of the video image from the video signal conversion subsystem and storing the received digital data words into a video memory;

after digital data words are present in the video memory, transmitting a signal to the personal computer which informs the personal computer that the digital data words are present; and repetitively receiving commands from the personal computer to transfer, to the internal bus of the personal computer, digital data words of the video image, and in response to each command received from the personal computer:

transferring digital data words of the video image from the video memory into word buffers until the word buffers have received, and are respectively temporarily storing, at least one digital data word of the video image; and transferring at least one digital data word of the video image, which is present in the word buffers, from the word buffers to the internal bus of the personal computer;

until the digital data words of the video image have been transferred from the video memory to the internal bus of the personal computer, whereby the personal computer may display the video image of the analog television signal on the display screen in real-time.

20. The method of claim 19 wherein the internal bus of the cooperating personal computer uses data words having thirty-two bits.

21. The method of claim 20 wherein each digital data word defining a pixel of the video image contains eight bits.

22. The method of claim 20 wherein each digital data word defining a pixel of the video image contains twenty-four bits.

23. The method of claim 19 wherein each digital data word defines a pixel of a black and white video image.

24. The method of claim 19 wherein each digital data word defines a pixel of a color video image.

25. A video data transfer apparatus for assembling and rapidly transferring digital data words defining pixels of a video image to a bus of a cooperating computer which includes a display screen upon which the computer may display the video image received from said video data transfer apparatus; said video data transfer apparatus comprising:

a video memory which receives the digital data words of the video image and which stores the received digital data words;

a video data transfer controller which transmits a signal that informs the computer when digital data words of the video image are present in said video memory, and which subsequently receives from the computer a command to transfer, to the bus of the computer, digital data words of the video image; and word buffers that operate in response to load signals received from the video data transfer controller for respectively receiving from said video memory and temporarily storing digital data words of the video image, and then the word buffers, in response to a transfer signal received from the video data transfer controller, transfer, to the bus of the computer, the digital data words of the video image, which is present in the word buffers.

26. The video data transfer apparatus of claim 25 wherein said video data transfer controller includes:

a programmable gate array logic integrated circuit for transmitting the signal that informs the computer when digital data words are present in said video memory, for receiving the command from the computer to transfer to the bus of the computer digital data words of the video image, and for producing both the load signals and the transfer signal to which said word buffers respond; and a read only memory for storing software instructions loaded into said programmable gate array logic integrated circuit.

27. The video data transfer apparatus of claim 26 wherein said read only memory also stores a driver program that is loaded into and executed by the cooperating computer to effect picture control and decoding operations of the computer.

28. The video data transfer apparatus of claim 26 wherein said video data transfer controller includes a read only memory for storing a driver program that is loaded into and executed by the cooperating computer to effect picture control and decoding operations of the computer.

29. The video data transfer apparatus of claim 26 wherein said word buffers in said video data transfer apparatus comprise four eight-bit buffers adapted to transfer thirty-two data bits for use in the cooperating computer which uses data words of thirty-two bits.

30. The video data transfer apparatus of claim 29 wherein all but one of said word buffers are latched uni-directional buffers, and the remaining one of said word buffers is a bi-directional buffer adapted to receive control signals from the cooperating computer.

31. The video data transfer apparatus of claim 26 wherein all but one of said word buffers are latched uni-directional buffers, and the remaining one of said word buffers is a bi-directional buffer adapted to receive control signals from the cooperating computer.

32. The video data transfer apparatus of claim 26 wherein each digital data word defines a pixel of a black and white video image.

33. The video data transfer apparatus of claim 26 wherein each digital data word defines a pixel of a color video image.

34. In an apparatus for displaying on a display screen of a computer a video image specified by digital data words defining pixels of the video image, the apparatus including a video data transfer apparatus which receives digital data words of the video image for assembling and rapidly transferring digital data words directly to a bus of the computer, the improvement comprising:

a video memory which receives the digital data words of the video image and which stores the received digital data words;

a video data transfer controller which transmits a signal that informs the computer when digital data words of the video image are present in said video memory, and which subsequently receives from the computer a command to transfer, to the bus of the computer, digital data words of the video image; and word buffers that operate in response to load signals received from the video data transfer controller for respectively receiving from said video memory and temporarily storing digital data words of the video image, and then the word buffers, in response to a transfer signal received from the video data transfer controller, transfer, to the bus of the computer, the digital data words of the video image, which is present in the word buffers.

35. The video data transfer apparatus of claim 34 wherein said video data transfer controller includes:

a programmable gate array logic integrated circuit for transmitting the signal that informs the computer when digital data words are present in said video memory, for receiving the command from the computer to transfer to the bus of the computer digital data words of the video image, and for producing both the load signals and the transfer signal to which said word buffers respond; and a read only memory for storing software instructions loaded into said programmable gate array logic integrated circuit.

36. The video data transfer apparatus of claim 35 wherein said read only memory also stores a driver program that is loaded into and executed by the cooperating computer to effect picture control and decoding operations of the computer.

37. The video data transfer apparatus of claim 34 wherein said video data transfer controller includes a read only memory for storing a driver program that is loaded into and executed by the cooperating computer to effect picture control and decoding operations of the computer.

38. The video data transfer apparatus of claim 34 wherein said word buffers in said video data transfer apparatus comprise four eight-bit buffers adapted to transfer thirty-two data bits for use in the cooperating computer which uses data words of thirty-two bits.

39. The video data transfer apparatus of claim 38 wherein all but one of said word buffers are latched uni-directional buffers, and the remaining one of said word buffers is a bi-directional buffer adapted to receive control signals from the cooperating computer.

40. The video data transfer apparatus of claim 34 wherein all but one of said word buffers are latched uni-directional buffers, and the remaining one of said word buffers is a bi-directional buffer adapted to receive control signals from the cooperating computer.

41. The video data transfer apparatus of claim 34 wherein each digital data word defines a pixel of a black and white video image.

42. The video data transfer apparatus of claim 34 wherein each digital data word defines a pixel of a color video image.

43. A method for receiving digital data words defining pixels of a video image; and for assembling and rapidly transferring the digital data words directly to a bus of a cooperating computer which includes a display screen upon which the computer may display the received video image; said method comprising the steps of:

receiving digital data words of the video image and storing the received digital data words into a video memory;

after digital data words are present in the video memory, transmitting a signal to the computer which informs the computer that the digital data words are present; and repetitively receiving commands from the computer to transfer, to the bus of the computer, digital data words of the video image, and in response to commands received from the computer:

transferring digital data words of the video image from the video memory into word buffers until the word buffers have received, and are respectively temporarily storing, at least one digital data word of the video image; and transferring at least one digital data word of the video image, which is present in the word buffers, from the word buffers to the bus of the computer;

until the digital data words of the video image have been transferred from the video memory to the bus of the computer.

44. The method of claim 43 wherein the bus of the cooperating computer uses data words having thirty-two bits.

45. The method of claim 44 wherein each digital data word defining a pixel of the video image contains eight bits.

46. The method of claim 44 wherein each digital data word defining a pixel of the video image contains twenty-four bits.

47. The method of claim 43 wherein each digital data word defines a pixel of a black and white video image.

48. The method of claim 43 wherein each digital data word defines a pixel of a color video image.

* * * * *